(12) United States Patent
Prakash et al.

(10) Patent No.: US 9,704,409 B2
(45) Date of Patent: Jul. 11, 2017

(54) PIGGYBACKING UNMANNED AERIAL VEHICLE

(71) Applicant: QUALCOMM Incorporated, San Diego, CA (US)

(72) Inventors: Arjun Prakash, San Diego, CA (US); Marcelo Ceribelli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 14/817,395

(22) Filed: Aug. 4, 2015

(65) Prior Publication Data

US 2016/0196756 A1 Jul. 7, 2016

Related U.S. Application Data

(60) Provisional application No. 62/033,275, filed on Aug. 5, 2014.

(51) Int. Cl.
*G01C 23/00* (2006.01)
*G05D 1/00* (2006.01)
(Continued)

(52) U.S. Cl.
CPC .......... *G08G 5/025* (2013.01); *B64C 39/024* (2013.01); *B64D 35/02* (2013.01); *B64F 1/00* (2013.01);
(Continued)

(58) Field of Classification Search
None
See application file for complete search history.

(56) References Cited

U.S. PATENT DOCUMENTS 8,511,606 B1 * 8/2013 Lutke .................... B64C 39/028
244/100 R
9,056,676 B1 * 6/2015 Wang ........................ B64F 1/00
(Continued)

FOREIGN PATENT DOCUMENTS

WO 2015026018 A1 2/2015

OTHER PUBLICATIONS

International Search Report and Written Opinion—PCT/US2015/043754—ISA/EPO—Nov. 9, 2015.
(Continued)

*Primary Examiner* — Nicholas Kiswanto
*Assistant Examiner* — Kenny A Taveras
(74) *Attorney, Agent, or Firm* — The Marbury Law Group, PLLC

(57) ABSTRACT

Various embodiments include methods for piggybacking an unmanned aerial vehicle (UAV) on a vehicle (e.g., motor vehicles and trailers coupled to motor vehicles) to reach a destination. Various embodiments may include determining whether to dock on a vehicle. One or more candidate vehicles may be identified for docking. Travel profile characteristics of the one or more candidate vehicles may be identified. A first vehicle may be selected from the one or more candidate vehicles based on one or more travel profile characteristics that assist the UAV in reaching the UAV destination. The UAV may dock with the first vehicle. While docked to the first vehicle the UAV may charge an onboard battery via an electrical connection in a docking structure or by harvesting energy in the wind caused by movement of the vehicle by configuring the UAV rotors to charge the battery.

29 Claims, 13 Drawing Sheets

(51) Int. Cl.
*G08G 5/02* (2006.01)
*B64C 39/02* (2006.01)
*B64D 35/02* (2006.01)
*B64F 1/00* (2006.01)
*G08G 5/00* (2006.01)

(52) U.S. Cl.
CPC ...... *G08G 5/0069* (2013.01); *B64C 2201/024* (2013.01); *B64C 2201/042* (2013.01); *B64C 2201/066* (2013.01); *B64C 2201/208* (2013.01)

(56) References Cited

U.S. PATENT DOCUMENTS

| | | | | |
|---|---|---|---|---|
| 9,302,783 | B2* | 4/2016 | Wang | B64F 1/00 |
| 9,384,668 | B2* | 7/2016 | Raptopoulos | G08G 5/0069 |
| 9,494,937 | B2* | 11/2016 | Siegel | G05D 1/0027 |
| 2011/0068224 | A1* | 3/2011 | Kang | B64C 39/024 |
| | | | | 244/116 |
| 2011/0208373 | A1* | 8/2011 | Lees | B64C 39/024 |
| | | | | 701/2 |
| 2013/0279393 | A1* | 10/2013 | Rubin | H04J 3/1694 |
| | | | | 370/312 |
| 2014/0032034 | A1* | 1/2014 | Raptopoulos | G08G 5/0069 |
| | | | | 701/25 |
| 2015/0102154 | A1* | 4/2015 | Duncan | B64C 39/022 |
| | | | | 244/2 |
| 2015/0120094 | A1* | 4/2015 | Kimchi | B64C 39/024 |
| | | | | 701/3 |
| 2015/0370251 | A1* | 12/2015 | Siegel | G05D 1/0027 |
| | | | | 701/2 |
| 2016/0009413 | A1* | 1/2016 | Lee | B64F 1/007 |
| | | | | 701/16 |
| 2016/0185466 | A1* | 6/2016 | Dreano, Jr. | G06Q 30/0635 |
| | | | | 705/26.81 |
| 2016/0196756 | A1* | 7/2016 | Prakash | B64C 39/024 |
| | | | | 701/3 |
| 2016/0200438 | A1* | 7/2016 | Bokeno | B64D 1/08 |
| | | | | 244/2 |
| 2016/0257401 | A1* | 9/2016 | Buchmueller | B64C 39/024 |
| 2017/0038778 | A1* | 2/2017 | Wang | G05D 1/10 |

OTHER PUBLICATIONS

Robinette T, "HorseFly 'Octocopter' Primed to Fly the Future to Your Front Door", Jun. 4, 2014 (Jun. 4, 2014), pp. 1-4, XP055221155, Retrieved from the Internet: URL:http://www.uc.edu/news/nr.aspx?id=1992.

Boyle R., "Phantom Ray Drone Makes Its First Flight, A Piggyback Ride on a Shuttle-Carrier 747," Popular Science, 2010, 11 pages.

Frey T.J., "Disrupting the Automobile's Future," 2008, vol. 42 (5), pp. 38-40, 42.

Insight Report, "Connected World Transforming Travel, Transportation and Supply chains," In collaboration with the Boston Consulting Group, May 2013, 48 pages.

* cited by examiner

PIGGYBACKING UNMANNED AERIAL VEHICLE

This application claims the benefit of priority to U.S. Provisional Patent Application No. 62/033,275, filed Aug. 5, 2014, the entire contents of which are hereby incorporated by reference for all purposes.

BACKGROUND

Exploration of the use of unmanned aerial vehicles (UAVs) by industry for delivering goods and products, surveillance, and other services is rapidly expanding. UAVs are convenient for rapid point-to-point delivery and/or unique aerial perspectives of a location; however, drawbacks exist. UAVs are generally powered by a rechargeable or replaceable electrical battery. Based on battery capacity, UAVs can travel only limited distances and can carry only a limited payload. Variable operating conditions, such as the size of the payload, wind conditions, route to delivery point, may impact the battery capacity making it difficult to consistently predict a flight distance range or battery life for an unmanned aerial vehicle (UAV). One solution proposes the use of automated recharging stations at regular distances where UAVs can land and swap or recharge batteries before continuing to a UAV destination. However, during the time in which the UAV is charging or undergoing battery replacement, movement toward the UAV destination is suspended resulting in delivery delays.

SUMMARY

Methods, devices, and systems of various embodiments are disclosed for operating a UAV by piggybacking to reach a destination. Various embodiments may include determining whether to dock on a vehicle (e.g., motor vehicles and/or trailers coupled to motor vehicles) to reach a UAV destination and identifying one or more candidate vehicles for docking in response to determining that the UAV should dock on a vehicle. The method may include determining travel profile characteristics of the one or more candidate vehicles, selecting from the one or more candidate vehicles a first vehicle having travel profile characteristics that will assist the UAV in reaching the UAV destination, and docking the UAV with the first vehicle.

In various embodiments, determining whether to dock on the vehicle may include determining whether a charge level of an onboard battery of the UAV is sufficient to meet a mission power parameter for reaching the UAV destination and determining to dock on the vehicle may be in response to determining that the charge level of the onboard battery of the UAV is insufficient to meet the mission power parameter. In addition, determining whether to dock on the vehicle may include determining whether docking on the vehicle is more cost effective for reaching the UAV destination than not docking on the vehicle.

In some embodiments, determining travel profile characteristics of the one or more candidate vehicles may include receiving from each of the one or more candidate vehicles the one or more travel profile characteristics via an established communication link. In some embodiments, determining travel profile characteristics of the one or more candidate vehicles may include receiving from a server computing device the one or more travel profile characteristics.

In some embodiments, identifying the one or more candidate vehicles for docking may include receiving an approval to dock from each of the one or more candidate vehicles. In some embodiments, identifying the one or more candidate vehicles for docking may include receiving an approval to dock from a vehicle that does not include a docking mechanism specifically for receiving the UAV.

In various embodiment, the one or more travel profile characteristics may include information selected from a group consisting of a current speed of the one or more candidate vehicles, a type of docking station with which the one or more candidate vehicles is equipped, whether the one or more candidate vehicles is willing to take small deviations from a course or route to allow the UAV to dock, whether the one or more candidate vehicles is willing to slow down to allow the UAV to dock, the maximum UAV weight the candidate vehicle may accept, the maximum UAV size the candidate vehicle can accept, traffic conditions, a location of the one or more candidate vehicles, a designated destination of the one or more candidate vehicles, a designated route of the one or more candidate vehicles, and contextual information from which an inferred destination or route may be determined by the processor.

In some embodiments, determining travel profile characteristics of the one or more candidate vehicles may include receiving candidate vehicle destination information associated with the one or more candidate vehicles, and selecting from among the one or more candidate vehicles a first vehicle having one or more travel profile characteristics that will assist the UAV in reaching the UAV destination may include comparing the candidate vehicle destination information of each of the one or more candidate vehicles to the UAV destination, and selecting the candidate vehicle with destination information that is compatible with the UAV destination.

In some embodiments, selecting the first vehicle from the one or more candidate vehicles may be based on one or more of a first proximity of the first vehicle to the UAV, a second proximity of a designated destination of the first vehicle to the UAV destination, and an average speed of the first vehicle toward the designated destination of the first vehicle.

In some embodiments, selecting from among the one or more candidate vehicles the first vehicle having one or more travel profile characteristics that will assist the UAV in reaching the UAV destination may include estimating a docking duration that the UAV will be able to remain docked with the first vehicle based on a designated destination of the first vehicle, wherein the estimated docking duration enables the UAV to recharge an onboard battery to a level meeting mission power parameters that will assist the UAV in reaching the UAV destination.

In some embodiments, selecting from among the one or more candidate vehicles the first vehicle having one or more travel profile characteristics that will assist the UAV in reaching the UAV destination may include estimating a quantity of energy that may be harvested once docked with the first vehicle, and selecting the first vehicle based at least in part on whether the estimated quantity of energy may enable the UAV to recharge an onboard battery to a level meeting mission power parameters that will assist the UAV in reaching the UAV destination.

In some embodiments, selecting from among the one or more candidate vehicles the first vehicle having one or more travel profile characteristics that will assist the UAV in reaching the UAV destination may include determining a net recharge quantity of an onboard battery that is estimated to be recharged once docked with the first vehicle in which the net recharge quantity may take into account an energy expenditure associated with the UAV completing a course deviation to reach the first vehicle, and selecting the first vehicle based at least in part on whether the net recharge quantity may enable the UAV to recharge the onboard battery to a level meeting mission power parameters that will assist the UAV in reaching the UAV destination.

In some embodiments, selecting from among the one or more candidate vehicles the first vehicle having one or more travel profile characteristics that will assist the UAV in reaching the UAV destination may include determining a level of risk associated with docking on the first vehicle, in which the level of risk may be selected from a group consisting of a disturbance likelihood, an ability of the UAV to remain stable while docked with the first vehicle, an availability of reliable fixation elements with the first vehicle, and a success rate of prior UAV piggybacking with the first vehicle. The first vehicle may be selected based at least in part on the determined level of risk.

In some embodiments, docking the UAV to the first vehicle may include flying the UAV to within a predetermined proximity of a docking mechanism of the first vehicle, and engaging a latching mechanism on the docking mechanism with a structure of the UAV.

Some embodiments may further include charging an onboard battery of the UAV via a power connection or wireless charging mechanism on the docking mechanism while the UAV is docked to the first vehicle. Various embodiments may further include charging an onboard battery of the UAV by using rotors to harvest energy from wind caused by vehicle movement while docked with the first vehicle.

Some embodiments may further include monitoring progress toward the UAV destination while docked to the first vehicle, determining whether to undock from the first vehicle based on the progress toward the UAV destination, and undocking the UAV from the first vehicle in response to determining to undock from the first vehicle. In some embodiments, determining whether to undock from the first vehicle may be based on an identification of a more suitable vehicle with new travel profile characteristics that will assist the UAV in reaching the UAV destination.

Some embodiments may further include monitoring charging of an onboard battery while docked to the first vehicle, determining whether to undock from the first vehicle based on whether the UAV has recharged the onboard battery to a predetermined level, and undocking the UAV from the first vehicle in response to determining to undock from the first vehicle.

Further embodiments include a UAV having a memory and a processor configured to execute operations of the methods described above. Further embodiments include a UAV having means for performing functions of the methods described above. Further embodiments include a non-transitory processor-readable storage medium having stored thereon processor-executable instructions configured to cause a processor to perform operations of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the claims.

DETAILED DESCRIPTION

Figure 1A:
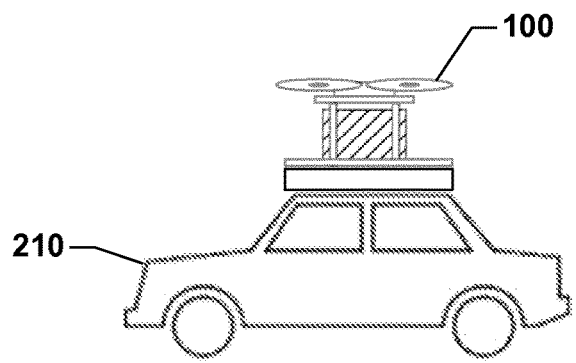
FIG. 1A is a schematic side elevation diagram of a UAV docked to a vehicle according to various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments facilitate a piggybacking UAV, which may move toward a UAV destination by identifying and docking on a selected vehicle from one or more candidate vehicles (e.g., motor vehicles and/or trailers coupled to motor vehicles). By docking on a candidate vehicle that is heading toward a UAV destination the UAV may conserve energy, conserve time, charge it's battery (if supported by the vehicle and/or the UAV), avoid obstacles, and so on. In various embodiments, a UAV may autonomously determine a need to piggyback, such as by determining that a distance to the UAV destination exceeds its flying range based on its battery charge state, a need to recharge the battery, and other factors such as package weight, weather conditions, and so on. The UAV according to various embodiments may identify a compatible vehicle for piggybacking by communicating with candidate vehicles or computing devices, such as with smart phones associated with the candidate vehicles, to determine the candidate vehicle's destination and/or route, as well as the compatibility of the vehicle for piggybacking. Drivers or vehicle owners may sign up or subscribe to permit and support piggybacking of UAVs (e.g., by subscribing to a piggybacking service), and may be compensated for doing so.

In various embodiments, a UAV may conduct an autonomous landing on the select vehicle, such as on a docking station that is attached or incorporated into the roof of the vehicle. In various embodiments, a UAV may autonomously detach from the select vehicle and proceed to the UAV destination once the select vehicle reaches a given point, such as when the select vehicle passes close by the UAV destination or turns onto a route leading away from the UAV destination. In various embodiments, the UAV may piggyback on one vehicle or on a sequence of vehicles in order to arrive at the UAV destination.

In various embodiments, candidate vehicles may be specially configured to support piggybacking such as by being equipped with a docking station. Owners of the vehicles may be compensated when a delivery UAV docks on the vehicle, thereby creating incentives and a potential business model for configuring the vehicle to accommodate UAVs. In other embodiments, ground vehicles that are associated with the UAV package delivery service may be configured with UAV docking stations.

In various embodiments, a delivery UAV may be equipped with a wireless communication device (e.g., a wireless machine to machine (M2M) device) and sufficient processing power and intelligence to determine possible routes, autonomously link to and exchange information with candidate vehicles. For example, delivery UAVs may be equipped with autonomous navigation that has further intelligence (e.g., a global positioning system (GPS) receiver or other sensors, and a smart routing algorithm) for locating/recognizing suitable candidate vehicles. The delivery UAV may be equipped with a landing/attachment mechanism that facilitates UAV docking, charging and undocking. A candidate vehicle for receiving the piggybacked UAV or a vehicle occupant may be equipped with a mobile computing device. The computing device in the candidate vehicle may include GPS or other navigation resources. In addition, the computing device in the candidate vehicle may be held by a passenger in the vehicle, or may be a built-in device (e.g., built into vehicle or docking mechanism). The candidate vehicle may be further equipped with a receiving or docking mechanism, such as a landing pad, charging terminals, mechanical catch gear, aerodynamic shield, and other mechanisms that are compatible with the delivery UAV.

During operation, a UAV implementing various embodiments may communicate with one or more candidate vehicles in its vicinity (e.g., vehicles within wireless communication range and/or close enough that the UAV may rendezvous with the vehicle). Through the communications with the candidate vehicle, the UAV processor may learn the destination and/or route of each of the candidate vehicles. By learning the candidate vehicle destinations through such communications, the candidate vehicle with a best destination or route for piggybacking may be identified. If destination or route information is not available, the UAV processor may predict a destination or route based on available context data such as information obtained from emails, texts or social media posts. The UAV may also predict the vehicle route or destination using algorithms that may make determinations based on a candidate vehicle's current location, direction and route/map knowledge. By obtaining, learning, or guessing the vehicle destination or travel route, the autonomous UAV may determine whether the candidate vehicle is a compatible candidate for at least a segment of the candidate vehicle's route.

In various embodiments, the UAV may be programmed with a UAV destination by an address or coordinates. Based on the programmed UAV destination, the UAV may determine an amount of energy required to reach the UAV destination based on factors such as the loads, weather/wind conditions, travel time to the UAV destination, and so on. The UAV may make further determinations based on energy required to make the return trip to a base station or a recharging station. The UAV may make a decision to piggyback for other reasons, such as a fault condition, weather condition (e.g. high winds), to avoid component stress, to recharge batteries, or to conserve onboard power. The UAV may calculate whether the current energy supply is enough to reach the UAV destination and return to a UAV base station. If the UAV determines that an onboard energy reserve (i.e., a level of remaining battery power) is insufficient to reach the UAV destination (and return from the UAV destination) or if the UAV decides to conserve energy, the UAV may attempt to locate a candidate vehicle for piggybacking. In various embodiments, a smart routing algorithm may direct the UAV towards roads with higher and faster vehicular traffic (e.g., highways, freeways, interstates) to search for participating vehicles that can take the UAV closer to the UAV destination.

Once the UAV succeeds in finding a candidate vehicle for piggybacking, such as a vehicle having a compatible destination and/or route, the UAV may communicate with the candidate vehicle to inform the vehicle of its intentions. Once a positive response is received from the vehicle, the UAV may match the vehicles direction and speed, and then fly an approach that enables it to attach to the vehicle through the landing and docking mechanism. Depending on the size and shape of the vehicle, the way in which the delivery UAV will attach to the docking mechanism may vary. In various embodiments, the docking mechanism may include a catch-and-secure docking mechanism that may facilitate capturing a UAV touching or hovering very near the docking mechanism, as well as securely anchor the UAV to the vehicle to prevent it from being blown off.

In some embodiments, the UAV may be configured to harvest energy from the wind created by the moving vehicle by configuring the rotor motors to function as generators as the wind spins the connected rotors. The UAV may include additional equipment that enables the UAV to orient its rotors to face the wind for increasing the efficiency of wind energy harvesting. This enables the UAV to recharge the battery without having to make an electrical connection with the vehicle. This provides a double boost to the UAV's range by being transported part of the way to the destination while recharging the battery.

In some embodiments, a catch-and-secure docking mechanism may couple electrical contacts on the UAV to charging connectors on the docking mechanism. The charging connectors on the docking mechanism may include power connectors or provisions for wireless charging for re-charging the UAV's battery. The power connectors may be coupled to the vehicle electrical system so that the vehicles alternator/battery provides the charging power. Alternatively, the docking station may have its own power system from which the power connectors obtain charging power.

The delivery UAV may ride on the candidate vehicle until the UAV determines that it should detach in order to proceed to its UAV destination, either directly or via piggybacking on another vehicle. The UAV may determine that it should detach based on a number of factors and criteria related to expediting arriving at the UAV destination sooner or with sufficient reserve battery power for the round trip. For example, the UAV may determine that it should detach when it determines that the vehicle's route has reached a closest point of approach to the UAV destination (e.g., driving by the UAV destination on the freeway) or reached a point where a better piggybacking opportunity may be available (e.g., crossing a freeway that is headed more directly towards the UAV destination). In various embodiments, the UAV may predetermine the point at which it will detach from the vehicle when or soon after it attaches based on knowledge of the candidate vehicle route. Alternatively or in addition, the delivery UAV may ride for as long as the candidate vehicle proceeds toward the UAV destination, such as so long as the distance to the UAV destination is decreasing. For example, if the UAV is unable to determine the vehicle's destination, it may simply monitor its position versus the UAV destination over time (e.g., using GPS) and determine that it should detach when it detects that the distance to the UAV destination is increasing.

During piggybacking, the UAV may also continue to look for other candidate vehicles that may be better able to help it to complete the route toward the UAV destination. For example, while riding on one vehicle the UAV may be monitoring other candidate vehicles to identify those moving faster or more directly towards the UAV destination (e.g., on a cross street headed towards the UAV destination). As another example, while riding on one vehicle the UAV may look for candidate vehicles reporting intended routes or destinations that are more compatible with the UAV destination. As another example, while riding on one vehicle the UAV may look for candidate vehicles traveling on faster routes (e.g., freeways versus surface streets) towards the UAV destination. As another example, the UAV may monitor other nearby candidate vehicles for those with better docking mechanisms (e.g., as including battery charging capability). As another example, the UAV may monitor other nearby candidate vehicles to identify those that are preferred for business reasons (e.g., company vehicles or vehicles whose owners have agreed to charge a lower fee for piggybacking services). If a better candidate vehicle is found nearby (i.e., close enough for the UAV to catch up to and land on), the UAV may detach from its current host vehicle and fly to the new vehicle for docking. The delivery UAV may continue hoping from one vehicle to the next in this manner until it can reach its UAV destination and begin the return trip using its current battery energy.

The term "unmanned aerial vehicle" (or "UAV") is used herein to refer to one of various types of aerial vehicles that may not utilize onboard, human pilots. A UAV may include an onboard computing device configured to operate the UAV without remote operating instructions (i.e., autonomously), such as from a human operator or remote computing device. Alternatively, the onboard computing device may be configured to operate the UAV with remote operating instruction or updates to instructions stored in a memory of the onboard computing device. The UAV may be propelled for movement in any of a number of known ways. For example, a plurality of propulsion units, each including one or more propellers or jets, may provide propulsion or lifting forces for the UAV and any payload carried by the UAV for travel or movement. In addition or alternatively, the UAV may include wheels, tank-tread, floatation devices or other non-aerial movement mechanisms to enable movement on the ground or across water. Further, the UAV may be powered by one or more types of power source, such as electrical, chemical, electro-chemical, or other power reserve, which may power the propulsion units, the onboard computing device and/or other onboard components.

As used herein, the term "docking station" refers to a mechanism that is configured to receive and/or secure a UAV relative to a vehicle. In various embodiments, a docking station may be temporarily or permanently attached to the vehicle and may include mechanisms to facilitate the approach, landing, and/or takeoff of the UAV, including a UAV laden with a payload such as a package for delivery. A docking station may be configured to attach to or secure a UAV that is hovering close to the docking station and draw-in the UAV for secure attachment thereto. A docking station may have charging terminals that mate with corresponding charging terminals on a UAV such that a UAV battery may be charged while docking at the docking station. A docking station may also include provisions for wireless or inductive charging capabilities for charging the UAV's battery supplies. A docking station may further be configured to release a UAV once docking is complete, such as when nearing a UAV destination.

As used herein, the term "travel profile characteristics" refers to information that may pertain to a vehicle, how fast the vehicle is traveling, where that vehicle is going, and how that vehicle may get there. Travel profile characteristics may include information selected from a group consisting of a current speed of a candidate vehicle, a type of docking station with which the candidate vehicle is equipped, whether the candidate vehicle is willing to take small deviations from a course or route to allow the UAV to dock, whether the candidate vehicle is willing to slow down to allow the UAV to dock, the maximum UAV weight and/or size the candidate vehicle would accept, traffic conditions, a location of the candidate vehicle, a destination of the candidate vehicle, a designated route of the candidate vehicle, and contextual information from which an inferred destination and/or route may be determined by the processor. In addition, travel profile characteristics may identify more than one destination, a route to each destination, map or travel directions, directions of travel, timing information relating to each destination, the current and/or previous locations of the candidate vehicle, details regarding the candidate vehicle and the like. In addition, travel profile characteristics may include route details (e.g., toll fees, low clearances, or planned stops), real-time traffic, weather, distance, flight restrictions along a route, obstacles, permissions, or other information that may be useful for docking, undocking, landing, piggybacking, and assisting the UAV in reaching a UAV destination. Travel profile characteristics may be used for determining whether a vehicle is suitable to assist a UAV in reaching a UAV destination.

The term "computing device" is used herein to refer to an electronic device equipped with at least a processor. Examples of computing devices may include UAV travel control and/or mission management computers, mobile devices (e.g., cellular telephones, wearable devices, smartphones, smartwatches, web-pads, tablet computers, Internet enabled cellular telephones, Wi-Fi® enabled electronic devices, personal data assistants (PDA's), laptop computers, etc.), personal computers, and server computing devices. In various embodiments, computing devices may be configured with memory and/or storage as well as networking capabilities, such as network transceiver(s) and antenna(s) configured to establish a wide area network (WAN) connection (e.g., a cellular network connection, etc.) and/or a local area network (LAN) connection (e.g., a wired/wireless connection to the Internet via a Wi-Fi® router, etc.). Examples of computing devices suitable for use with the various embodiments are described with reference to FIGS. 8-10.

The term "server" as used herein refers to any computing device capable of functioning as a server, such as a master exchange server, web server, and a personal or mobile computing device configured with software to execute server functions (e.g., a "light server"). Thus, various computing devices may function as a server, such as any one or all of cellular telephones, smart-phones, web-pads, tablet computers, Internet enabled cellular telephones, Wi-Fi® enabled electronic devices, laptop computers, personal computers, and similar electronic devices equipped with at least a processor, memory, and configured to communicate with a UAV. A server may be a dedicated computing device or a computing device including a server module (e.g., running an application that may cause the computing device to operate as a server). A server module (or server application) may be a full function server module, or a light or secondary server module (e.g., light or secondary server application). A light server or secondary server may be a slimmed-down version of server type functionality that may be implemented on a personal or mobile computing device, such as a smart phone, thereby enabling it to function as an Internet server (e.g., an enterprise e-mail server) to a limited extent, such as necessary to provide the functionality described herein. An example of server suitable for use with the various embodiments is described with reference to FIG. 10.

The word "exemplary" is used herein to mean "serving as an example, instance, or illustration." Any implementation described herein as "exemplary" is not necessarily to be construed as preferred or advantageous over other implementations.

A UAV 100 piggybacking in a docked position on a motor vehicle 210 is illustrated in FIG. 1A. The UAV 100 in accordance with various embodiments may be configured to piggyback on a vehicle (e.g., motor vehicle 210) to conserve energy, conserve time, charge a battery (if supported by the motor vehicle 210 and/or the UAV 100), avoid obstacles, and so on. The motor vehicle 210 is an example of candidate vehicles on which the UAV 100 may dock. While the motor vehicle 210 is illustrated as a sedan-style car as an example, numerous other types of vehicles, including motor vehicles and trailers coupled to motor vehicles, may be suitable for piggybacking in accordance with various embodiments.

Prior to docking on the motor vehicle 210, the UAV may determine whether docking on any motor vehicle is desirable in order to reach a UAV destination. Such a determination about whether to dock may be based on power requirements for the UAV to reach the UAV destination, encumbrances on the UAV 100 (e.g., a heavy payload), costs, time, availability of resources, safety, a likelihood of successfully docking and/or recharging onboard batteries, as well as other factors. In response to determining that docking is desirable, the UAV 100 may identify one or more candidate vehicles for docking and identify one or more of the candidate vehicles that has one or more travel profile characteristics that may assist the UAV 100 in reaching the UAV destination. The UAV 100 may choose a first motor vehicle (e.g., the motor vehicle 210) from among the one or more candidate vehicles and dock with the first motor vehicle.

Figure 1B:
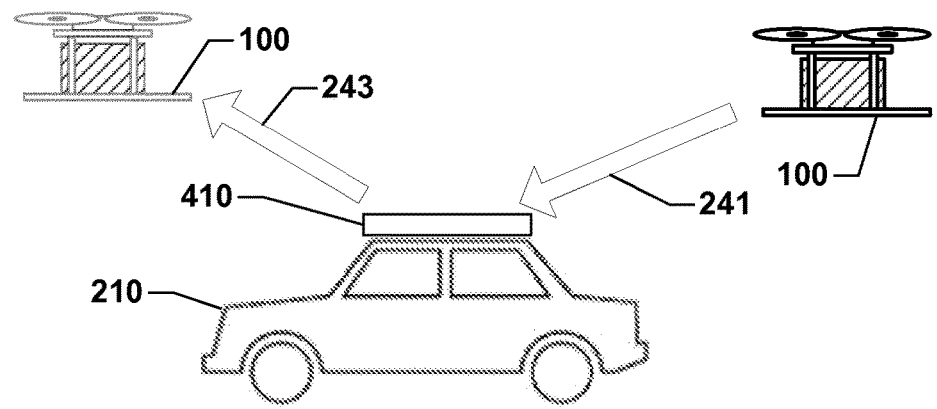
FIG. 1B is a schematic side elevation diagram of the UAV of FIG. 1A approaching and separating from the vehicle of FIG. 1A according to various embodiments.

In various embodiments, the UAV 100 may fly to the motor vehicle 210 for docking and subsequently undock therefrom as illustrated in FIG. 1B. With reference to FIGS. 1A-1B, the UAV 100 is illustrated approaching and separating from the motor vehicle 210 through a docking sequence and an undocking sequence. The motor vehicle 210 may be provided with a docking station 410, which may be configured on a roof of the motor vehicle 210. The docking station 410 may be temporarily or permanently attached to the motor vehicle 210 and may be configured to facilitate docking and undocking of the UAV 100. Alternatively, the motor vehicle 210 may not include the docking station 410 or may include a different mechanism for docking with the UAV 100. For example, in an ad-hoc piggybacking circumstance, the UAV 100 may dock with a motor vehicle that does not include a docking station 410 by resting on a roof or other surface of the motor vehicle.

In various embodiments, the UAV 100 may communicate, rendezvous with, dock, and undock from a selected motor vehicle as illustrated in FIGS. 2A-2D. With reference to FIGS. 1A-2D an operating environment 200 may include a roadway 201 with numerous vehicles including candidate vehicles 210, 213, 215, and so on. For example, the UAV 100 may be programmed to proceed from a current position A to a UAV destination B. The current position A may be a position along a route to the UAV destination B, which originated from a starting point (not shown) such as a base station or deployment station for the UAV 100.

The UAV 100 may establish communications with the candidate vehicles 210, 213, 215 through wireless connections 210a, 213a, 215a. The wireless connections 210a, 213a, 215a may represent links to the many vehicles on the roadway 201 participating in the piggybacking for the UAV 100. The wireless connections 210a, 213a, 215a may be established with communication devices in the candidate vehicles 210, 213, 215 or with computing devices of occupants of the candidate vehicles 210, 213, 215.

The UAV 100 may further establish a wireless connection 231 with a cellular infrastructure 230 in order to communicate with a server 1000 associated with a package delivery service or similar entity. Communications associated with the wireless connection 231 may be broadband data communications conducted with the server 1000 through the Internet 221. By communicating with the server 1000, the UAV 100 may obtain information including UAV destination, route information, real-time traffic information, weather information, distance information, flight restriction information, obstacle information, or other information that may be useful for operation, docking, landing, and proceeding to the UAV destination.

In various embodiments, the candidate vehicles 210, 213, 215 may optionally establish the wireless connections 210b, 213b, 215b with the server 1000 through the cellular infrastructure 230 and/or the Internet 221. Through an application (i.e., a specific program) executing on the vehicle-based computing devices in the candidate vehicles 210, 213, 215, the UAV 100 may communicate with the server 1000 through a hop or similar relay or coordination through one or more of the pairs of the wireless connections 210a and 210b, 213a and 213b, and 215a and 215b. In other words, the UAV 100 may communicate directly with the vehicle-based computing device, which, in turn may communicate with the server 1000 through a cellular connection, and vice versa. In addition, the UAV may communicate with the candidate vehicle 210, 213, 215 through the server, using the wireless connections 231, 210b, 213b, 215b.

Figure 2A:
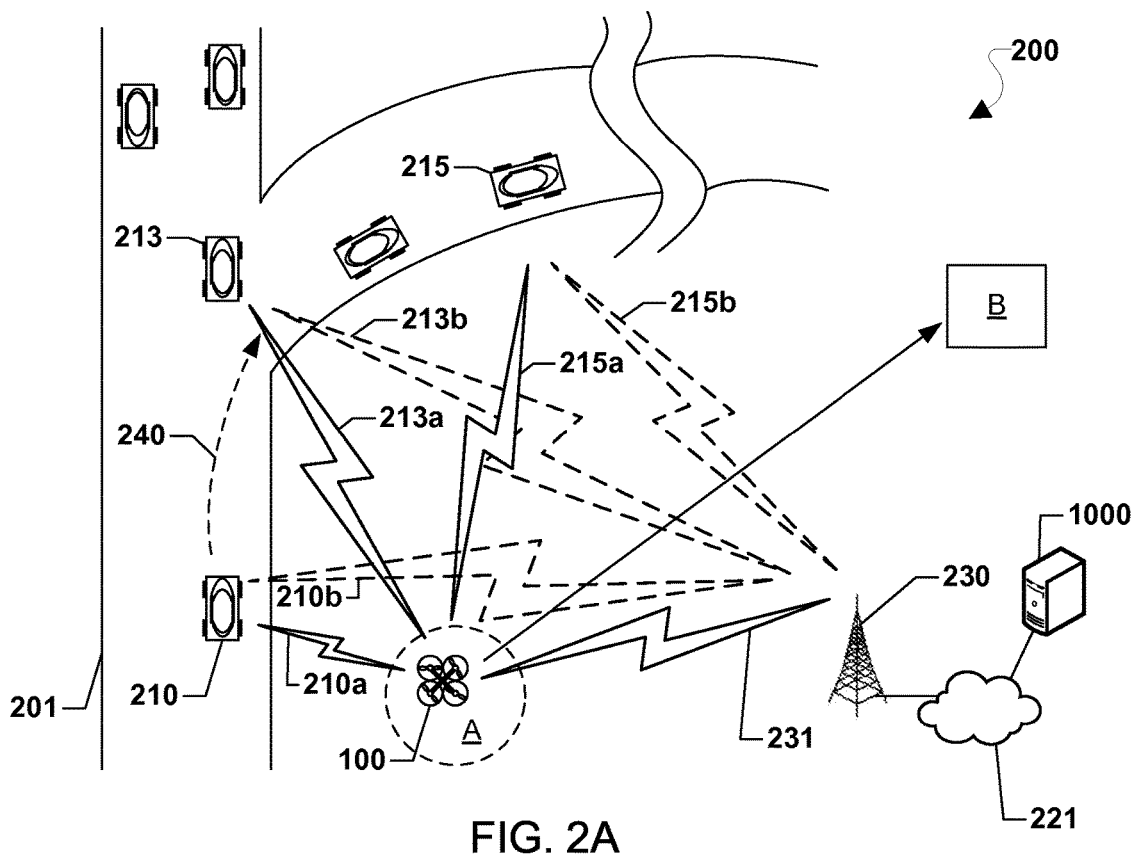
FIGS. 2A-FIG. 2D are diagrams illustrating a UAV in various operating environments with one or more candidate vehicles for piggybacking according to various embodiments.
Figure 2B:
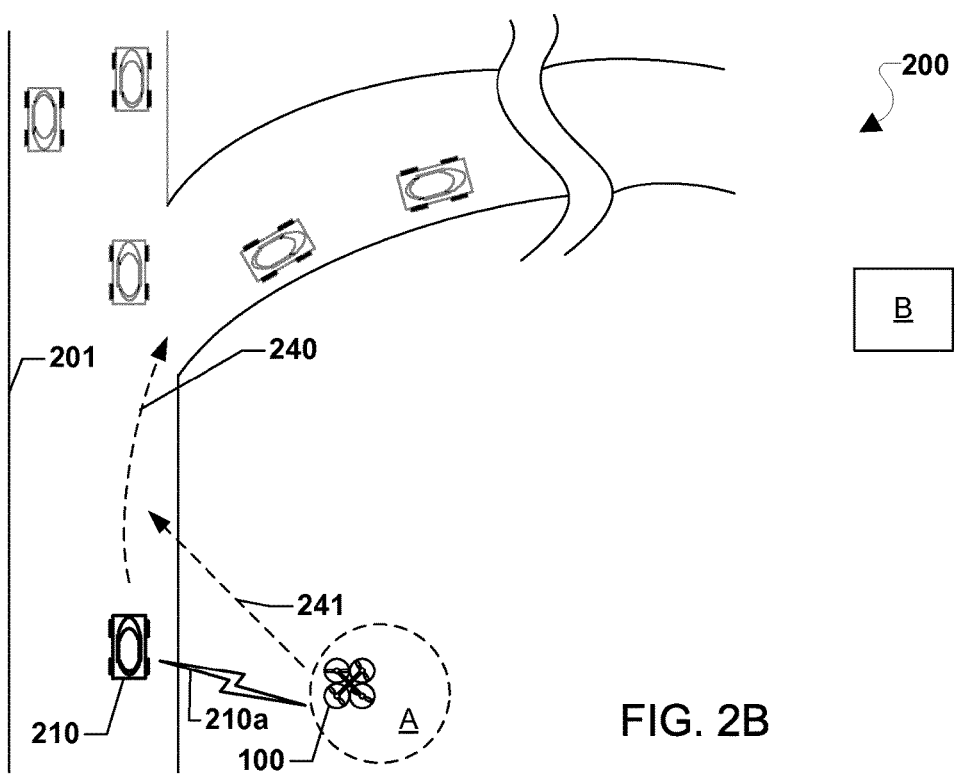

As illustrated in FIG. 2B and with reference to FIGS. 1A-2B, using one or more of the wireless connections 210a, 210b, 213a, 213b, 215a, 215b, 231, the UAV 100 may communicate with the candidate vehicles 210, 213, 215, and optionally with the server 1000, to obtain travel profile characteristics, such as the destination of one or more of the candidate vehicles 210, 213, 215. The travel profile characteristics may be used to determine the candidate motor vehicles that has one or more suitable travel profile characteristic that may assist the UAV 100 in reaching the UAV destination B.

In various embodiments, the travel profile characteristics may be obtained directly from mobile computing devices, such as navigation or GPS data stored in the mobile computing devices. Smart cars in the future may be capable of self-driving and hence such cars may be aware of the destination and travelling route. In various embodiments, the travel profile characteristics, such as the destination information, may be obtained through a query coordinated through an application that may be executing on each of the mobile computing devices and a processor of the UAV 100. Further, the travel profile characteristics of each of the vehicles may be obtained through contextual information available on each mobile computing device, which may be accessed through the operation of the application. For example, the application may monitor social media posts associated with a user of the mobile computing device and determine the destination from the social media posts. The mobile computing device may also learn the routine and habits of one or more people using the vehicle and make educated guesses based on information available from emails, calendars and other apps available on the mobile computing device. Based on the time and day, and also based on other context aware information available on or to the mobile computing device, the mobile computing device may make good guesses on the direction or destination of the vehicle, as well as other travel profile characteristics. When direct destination information is still not obtained, the UAV 100 may rely on the vehicle's direction of travel since vehicles are constrained to follow roadways that may be known to the UAV's processor in the form of map data.

Based on communications with the candidate vehicles 210, 213, 215 and the obtained travel profile characteristics, the UAV 100 may determine the candidate motor vehicle that is near the current position A of the UAV 100, has a compatible destination (or current direction of travel), such as in a direction along a route 240 toward the UAV destination B. The UAV 100 may then select one of the candidate motor vehicles and proceed along the approach flight path 241 to intercept the motor vehicle 210 for docking. The approach flight path 241 may be determined based on knowledge of the speed and direction or a route 240 of the motor vehicle 210. The UAV 100 may coordinate the intersection of the approach flight path 241 of the UAV 100 and the route 240 of the motor vehicle 210 in order to achieve a suitable docking location. In some embodiments, the UAV 100 and the motor vehicle 210 may coordinate to conduct the docking in a location while the motor vehicle 210 is stopped. In other embodiments, the motor vehicle 210 may reduce its speed below a docking threshold speed that allows a dynamic docking of the UAV 100 with the motor vehicle 210. Alternatively, high-speed docking (i.e., at full highway speeds) may be performed if the circumstances and docking mechanisms warrant.

Figure 2C:
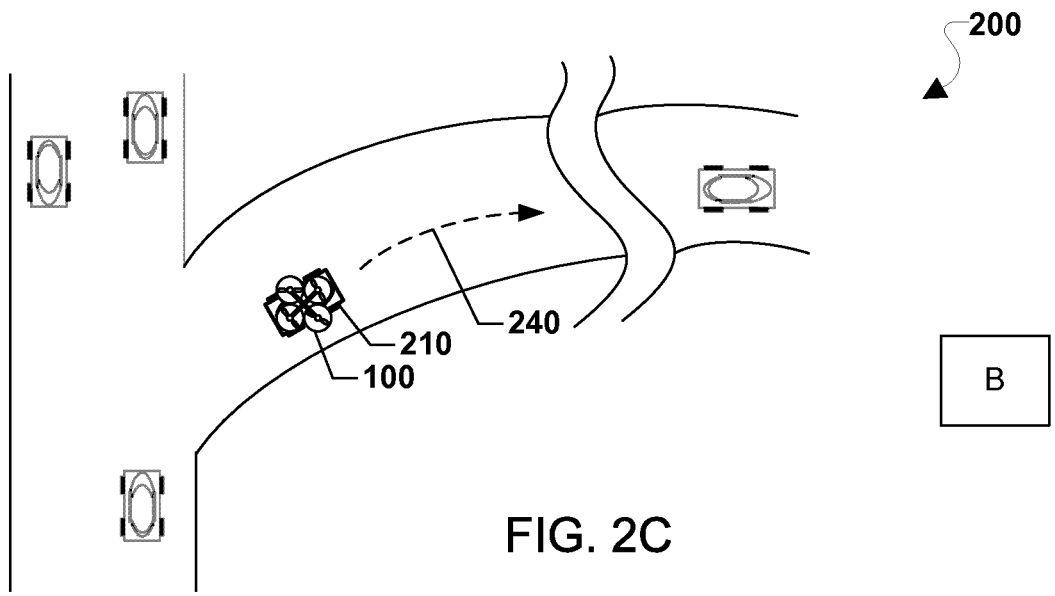
Figure 2D:
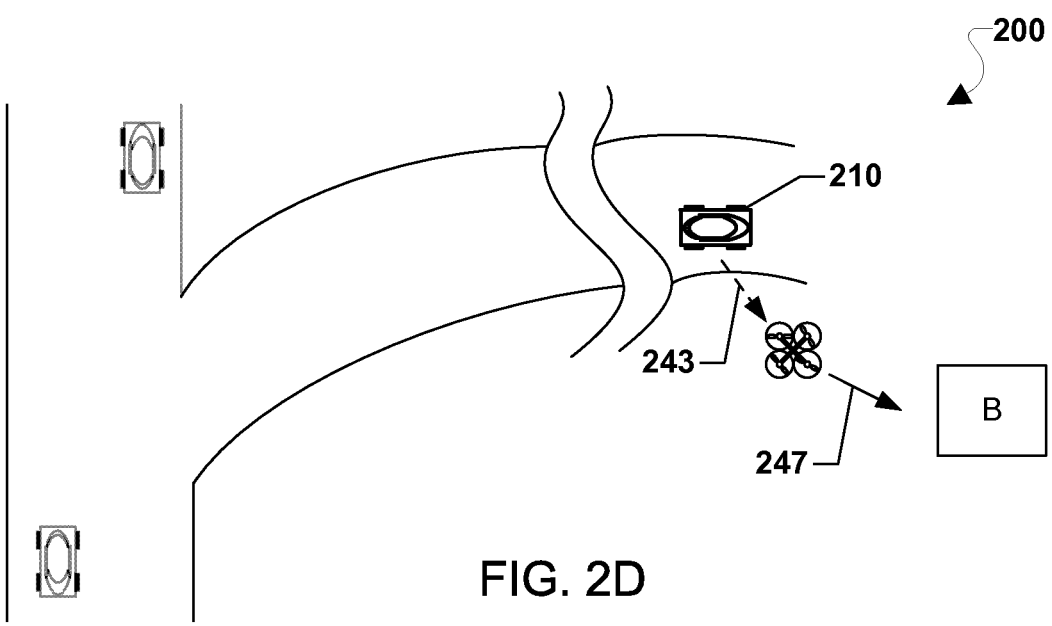

The UAV 100 may proceed along an approach flight path 241 to rendezvous with the motor vehicle. The UAV 100 may hover, and mechanisms associated with a docking station may take over and bring the UAV 100 into contact for a completed landing or docking. As illustrated in FIG. 2C, once the UAV 100 is docked to the motor vehicle 210 the UAV may remain docked for a piggybacking segment during which battery conservation and/or recharging may take place. As illustrated in FIG. 2D, when the piggybacking segment is completed, the UAV 100 may be released from the docking station 410 and proceed on a departure flight path 243 to clear the vehicle and other traffic in the area. After being released, the UAV 100 may continue on a destination flight path 247 to fly toward and land at the destination B, or may continue to look for additional vehicles on which to piggyback.

Figure 3A:
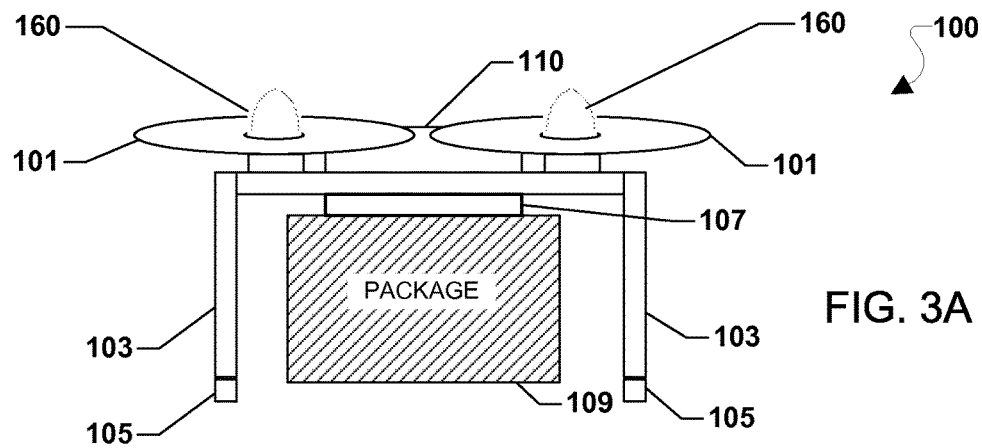
FIG. 3A is a schematic front elevation view of a UAV suitable for use in various embodiments.
Figure 3B:
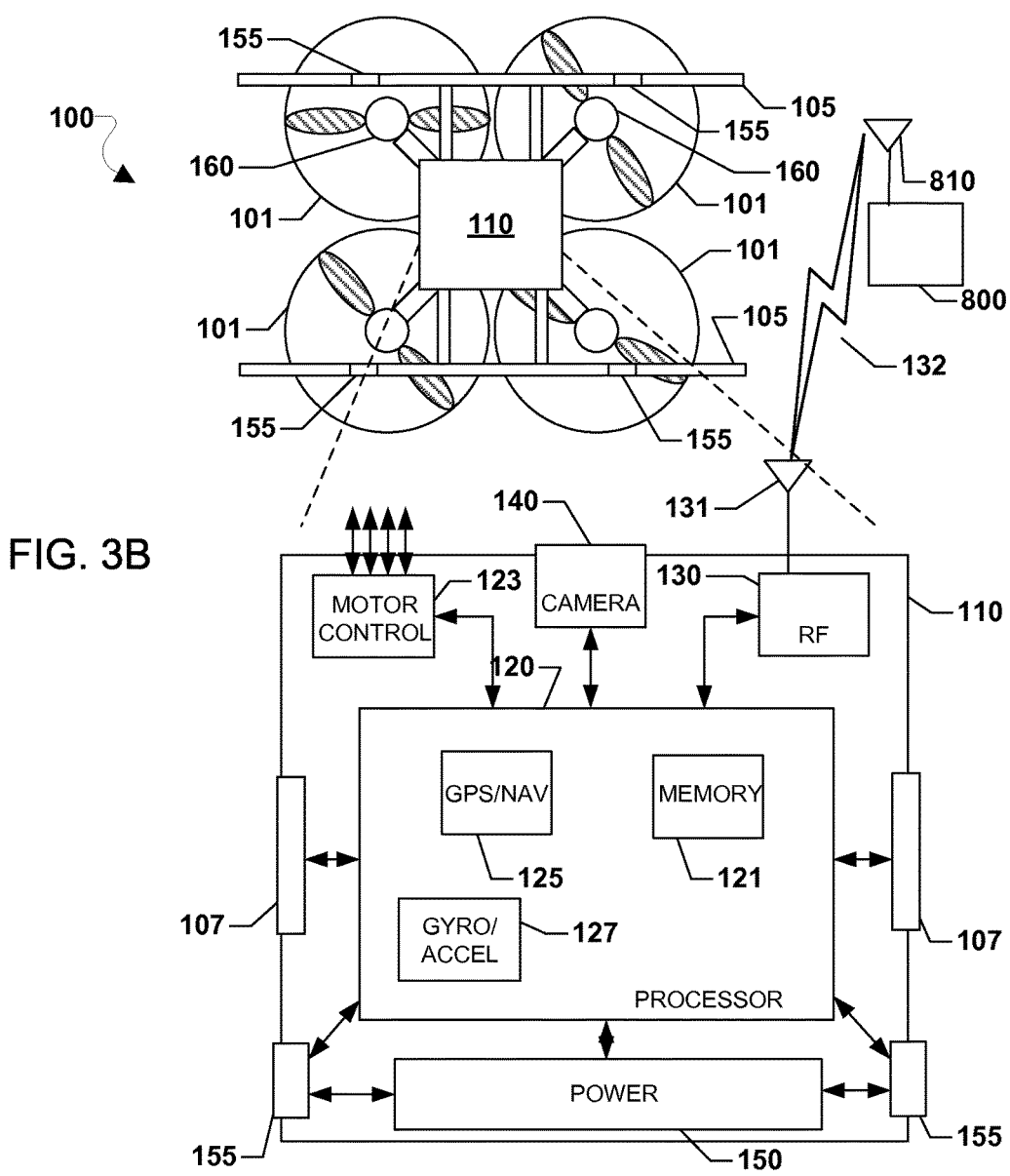
FIG. 3B is a schematic plan view of the UAV of FIG. 3A with a schematic relief diagram of a control unit and mobile computing device according to various embodiments.

Various embodiments may be implemented using a variety of UAV configurations, an example of which is illustrated in FIGS. 3A and 3B in the form of a quad copter. However, other types of UAVs may be used. A common UAV configuration suitable for use in the various embodiments may include a "quad copter" configuration.

FIGS. 3A and 3B illustrate a UAV, such as the UAV 100 in FIGS. 1A-2D, in accordance with various embodiments. With reference to FIGS. 1A-3B, the UAV 100 may include rotors 101 and flight motors 160 that may be fixed to a frame 103 and landing skids 105 that may support a full weight of the UAV 100. In various embodiments, the UAV 100 may be configured to secure a package 109 as illustrated in FIGS. 3A and 3B. The UAV 100 may include a package securing unit 107 for securing the package 109. The package securing unit 107 may include a gripping and release mechanism, motor, and so on, that may be rated sufficiently to grasp and hold the package 109. The package securing unit 107 may include a motor that drives a gripping and release mechanism and controls, which may be responsive to grip and release the package 109 at appropriate times, such as when instructed by a control unit 110 illustrated in FIG. 3B. Optionally, the package 109 may be enclosed by the frame 103 and landing skids 105 underneath the flight motors 160 or rotors 101.

A quad copter-style horizontal rotor UAV may fly in any unobstructed horizontal and vertical direction or may hover in one place. A UAV may be configured with processing and communication devices that enable the UAV to navigate, such as by controlling the flight motors to achieve flight directionality and to receive position information and information from other system components including vehicle systems, package delivery service servers and so on. The position information may be associated with the current UAV position and the location of the UAV destination or position information obtained regarding candidate vehicle destinations, locations of charging stations, etc.

For ease of description and illustration, some details of the UAV 100 are omitted such as wiring, frame structure interconnects or other features that would be known to one of skill in the art. For example, while the UAV 100 is shown and described as having frame members such as the frame 103. The UAV 100 may be constructed with a molded frame where support is obtained through the molded structure. In various embodiments, the UAV 100 may have four rotors 101. However, more or fewer of the rotors 101 may be included.

In various embodiments, the UAV 100 may be configured to receive an external source of power for recharging. The landing skids 105 of the UAV 100 may be provided with charging terminals 155. The charging terminals 155 may provide a connection between the battery of the UAV 100 and an external source of charging power. The charging terminals 155 may be arranged such that some are configured with one polarity and others configured with an opposite polarity, corresponding to which battery terminal the particular one of the charging terminals 155 is connected. The polarity of the charging terminals 155 may also be coordinated with the location and polarity of the corresponding charging connections on a docking station to which the charging terminals connect to once the UAV 100 is in a docked position. In various embodiments, the charging terminals may provide additional connections with a docking station such as wired communication or control connections. In various embodiments, the delivery UAV and the candidate vehicle may provide means for wireless/inductive charging of the UAV's battery. The UAV 100 may further include a control unit 110 that may house various circuits and devices used to power and control the operation of the UAV 100, including motors for powering the rotors 101, a battery, a communication module and so on as described.

The control unit 110 may include a processor 120, a radio frequency (RF) module 130, and a power module 150. The processor 120 may include a memory 121, a global positioning system (GPS) navigation unit 125, and sufficient processing power to conduct various control and computing operations for controlling the UAV 100 and UAV subsystems. The processor 120 may be coupled to the package securing unit 107 and the charging terminals 155. The processor 120 may be directly powered during docking from the charging terminals 155 or may be powered from the power module 150 or a combination. Further, the processor 120 may control the charging of the power module 150, such as by being equipped with charging control algorithm and a charge control circuit. The processor 120 may be coupled to a motor control unit 123 that manages the motors that drive the rotors 101.

The power module 150 may include one or more batteries that may provide power to various components, including the processor 120, the flight motors 160, the package securing unit 107, and the RF module 130. In particular, the batteries included in the power module 150 may be rechargeable and coupled to the flight motors 160 that are configured to function as generators when the rotors 101 are turned by wind. The processor 120 may be configured with processor-executable instructions to control the charging of the power module 150 (i.e., the storage of energy supplied by the docking station or harvested energy while docked to the docking station) by the flight motors 160 and/or by the charging terminals 155, such as by executing a charging control algorithm using a charge control circuit. Alternatively or additionally, the power module 150 may be configured to manage its own charging by regulating power received from the flight motors 160, and/or power received from the charging terminals 155, that is applied to recharging batteries.

Through control of individual ones of the flight motors 160 connected to the rotors 101, the UAV 100 may control flight toward a UAV destination. The processor 120 may receive input from the GPS navigation unit 125 in order to determine its present position, a position of a UAV destination, and other positions, such as a position of a landing point. A gyro/accelerometer unit 127 may also be provided to generate relative position information about the three-dimensional orientation and movement of the UAV 100.

In various embodiments, the rotors 101 may not only be used by the UAV 100 for propulsion, but may also be used like wind turbines to generate electricity via the flight motors 160 when rotated by wind or updrafts, thus harvesting wind energy. For example, the UAV 100 may be configured to harvest wind energy while perched atop a motor vehicle (e.g., docked in a docking station), may shut-down most power consuming components, allow wind to turn the rotors 101 that drive the flight motors 160 so that the rotors 101 function as generators to generate electricity that may be stored in rechargeable batteries within the power module 150. Further, the UAV 100 may take advantage of thermal exhausts, such as from a motor vehicle exhaust pipe, which may be exploited to collect thermal energy. In some embodiments, the UAV 100 may include solar cells for converting solar energy into electrical energy. Further, the UAV 100 may include equipment that may enable the UAV 100 to orient its rotors 101 to face the wind in order to increase the efficiency of wind energy harvesting.

In various embodiments, the control unit 110 of the UAV 100 may be equipped with a camera unit 140, which may be used for a variety of applications. For example, the camera unit 140 may be used to facilitate navigation, such as enabling the UAV 100 to follow or navigate toward an identified feature such as a road intersection. The camera unit 140 may be used for other purposes such as vehicle identification, guiding the UAV to landing on a docking mechanism, photographing or identifying the recipient of the package, and so on.

The processor 120 may communicate with a mobile computing device 800 through the RF module 130. A bi-directional wireless link 132 may be established between onboard antenna 131 of the RF module 130 and a mobile computing device antenna 810 of the mobile computing device 800. The RF module 130 may be configured to receive GPS signals from a satellite or other signals used by the UAV 100. The mobile computing device 800 may be a device located in a candidate vehicle or may be a device associated with a user who is inside a candidate vehicle. The mobile computing device 800 may alternatively be a server associated with the package delivery service or operator of the UAV 100. The RF module 130 may support communications with multiple ones of the mobile computing devices 800. While the various components of the control unit 110 are shown as separate components, in various embodiments some of the electronic components, such as the processor 120, the motor control unit 123, the RF module 130, and possibly other units, may be integrated together in a single device, chip circuit board or system-on-chip.

Various embodiments may be implemented within a variety of communication networks, such as private networks between computing devices, public networks between computing devices, or combinations of private and public networks, as well as cellular data networks and satellite communication networks. A UAV may travel over varying distances over varying terrain including roadways. Therefore, UAV and vehicle mobility may require communications to be maintained while the UAV is travelling toward the UAV destination in either a docked or de-docked and flying state.

The UAV 100 may perform a docking sequence in order to dock to the docking station 410 of the motor vehicle 210 as illustrated in FIGS. 4A-4D. With reference to FIGS. 1A-4D, the UAV 100 may begin the docking sequence from a hover position with respect to motor vehicle 210 or moving along with the motor vehicle 210 at a speed that is at or below a docking threshold speed (e.g., FIG. 4A). In various embodiments, a windscreen 419 may be provided in connection with the docking station 410 (or the motor vehicle 210) to enable docking while the motor vehicle 210 is moving. The docking station 410 may be provided with a power supply 420, which may be coupled to a charging controller 417 and terminals 415 that are configured to make contact with charging terminals 155 of the UAV 100 during docking and charge a battery or power supply of the UAV 100.

The docking station 410 may be provided with guide arms 413, which may be bail mechanisms or other suitable catching and securing mechanisms powered by docking motors 412. The guide arms 413 may be controlled by the docking motors 412 to be in various positions, such as open, closed or intermediate positions. One or more of the guide arms 413 may be configured to be in a position to "catch" the UAV 100 during a landing approach maneuver such as when the UAV 100 enters the docking zone 411 (e.g., FIG. 4B). The docking motors 412 or sensors may detect when the UAV 100 comes into contact. Once contact is detected, the docking motors 412 may bring the guide arms 413 into further contact with the UAV 100. For example, during the catching operation illustrated in FIG. 4B, a forward one of the guide arms 413 may be in a raised position to "catch" the UAV 100. Once contact is detected, one of the rear ones of the guide arms 413 may raise such that the trailing end of the UAV 100, which may still be hovering, can be secured (e.g., FIG. 4C).

Figure 4A:
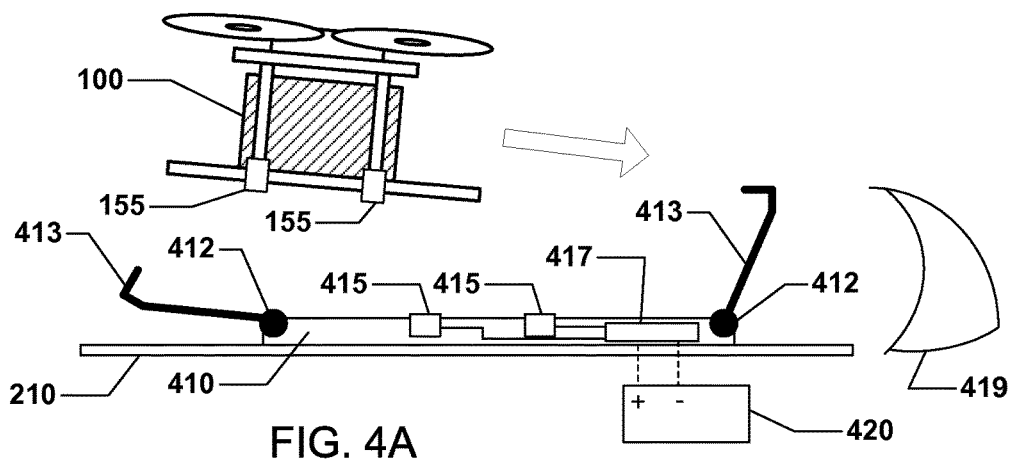
FIGS. 4A-FIG. 4D are diagrams illustrating a docking sequence and components of a docking system suitable for use with various embodiments.
Figure 4B:
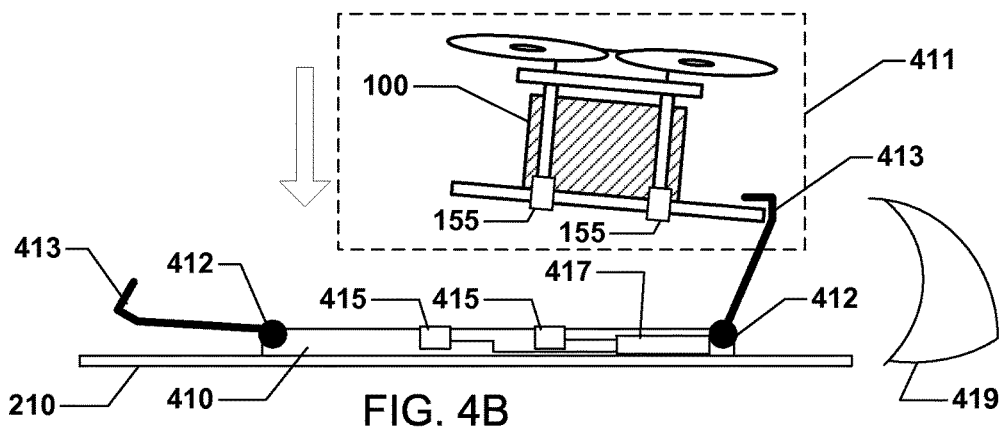
Figure 4C:
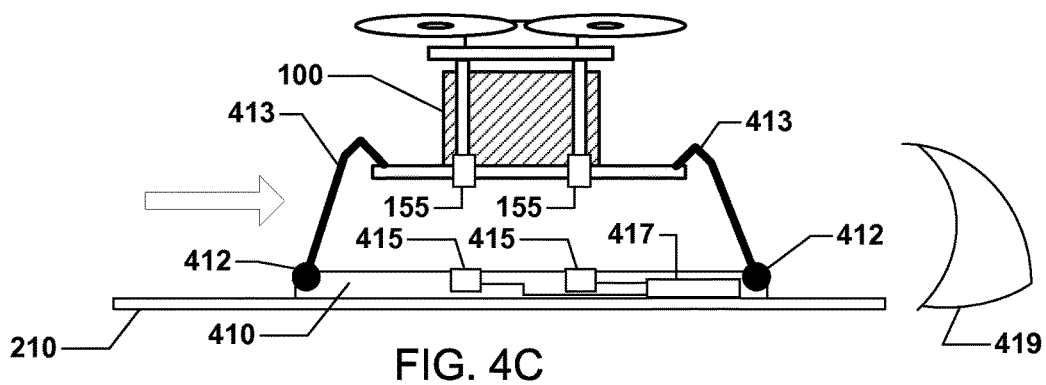
Figure 4D:
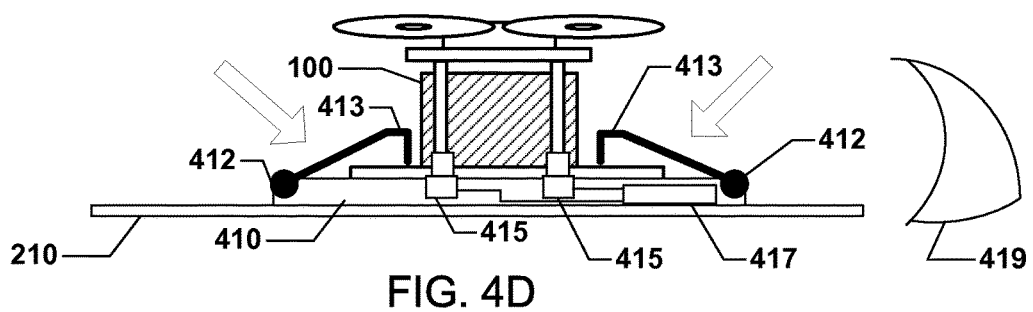
Figure 4E:
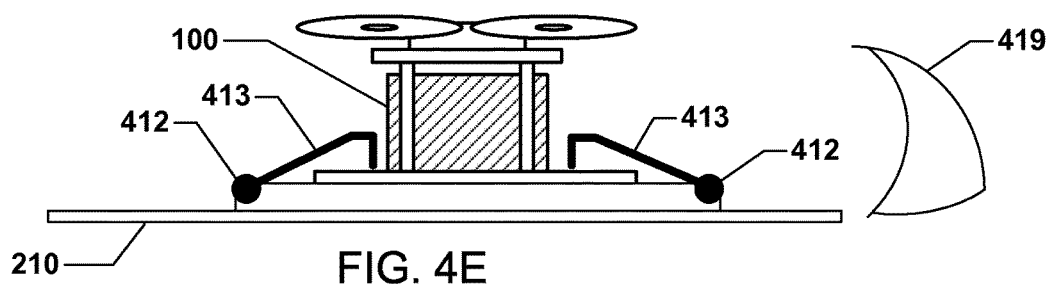
FIGS. 4E-FIG. 4H are diagrams illustrating an undocking sequence and components of a docking system suitable for use with various embodiments.

Once the UAV 100 is securely caught between the guide arms 413, the UAV 100 may be lowered into a secure position (e.g., FIG. 4D). The UAV 100 may be in communication with computing devices associated with the motor vehicle 210 in order to determine that it may de-energize its motors or lower itself toward the docking station 410. Alternatively or in addition, the guide arms 413 may force the UAV 100 into the lowered position through the operation of the motors such that in the event the docking is aborted, the UAV 100 may continue to fly. Once in the fully docked position, as illustrated in FIG. 4D, the terminals 415 may be in contact with the charging terminals 155 of the UAV 100 and charging of the power supply of the UAV 100, and/or the process to harvest wind, may be commenced.

The UAV 100 may perform an undocking sequence in order to separate from the docking station 410 of the motor vehicle 210 as illustrated in FIGS. 4E-4H. With reference to FIGS. 1A-4H, the undocking sequence may occur once the UAV 100 determines that its current position is close to the UAV destination B or that another vehicle has a destination that is more compatible with the UAV destination B or other reasons. Such determinations may be made at the time of a docking decision with the motor vehicle 210 or subsequent to docking. For example, the UAV 100 may determine that the motor vehicle 210 may be compatible with only a portion of the necessary route toward the destination B, which terminates at an intermediate waypoint. Upon approaching the intermediate way point, the UAV 100 may begin to communicate with nearby vehicles as described herein to determine a new vehicle for a next leg toward the destination B.

In various embodiments, the server 1000 may determine a compatible vehicle by monitoring participating vehicles in the vicinity of the UAV 100, such as within a wireless communication range or close enough that the UAV can rendezvous with the vehicle considering each vehicle's speed and location. The server 1000 may compile travel profile characteristics for identifying candidate vehicles that are compatible for the UAV. For example, the travel profile characteristics may include information about one or more of environmental conditions, a current speed of the vehicle, a type of docking station that the vehicle is equipped with, whether the vehicle is willing to take small deviations from a course or route to allow the UAV to dock, whether the vehicle is willing to slow down to allow the UAV to dock, a maximum UAV weight and/or size the candidate vehicle may accept, traffic conditions, a location of the vehicle, a route of the vehicle, a destination of the vehicle, a receptivity of the vehicle to UAV docking, and a destination information inferred by the processor of the UAV from contextual information obtained from the computing devices. Each of the travel profile characteristics compiled may enable the server 1000 or the UAV's processor to determine a newly selected vehicle is suitable to assist the UAV 100 in reaching the UAV destination B. The server 1000 may relay information about the newly selected vehicle to the UAV 100 such that communications may be established between the UAV 100 and the newly selected vehicle. The UAV 100 may further communicate with a particular vehicle-based computing device associated with the motor vehicle 210 to coordinate the undocking sequence. In this way, charging may be deactivated and other procedures executed before the undocking begins.

Figure 4F:
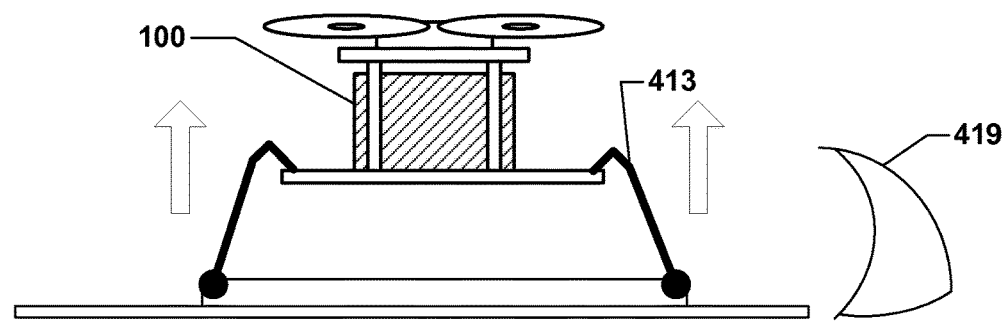

Once the UAV 100 determines that undocking is required, the guide arms 413 may be moved by the docking motors 412 to a raised position (e.g., FIG. 4F). The UAV 100 may activate the flight motors (e.g., 160) or the flight motors may have remained active during the piggybacking segment. Further, undocking may be conducted as a suitable stopping point or at a moving speed that is at or below an undocking speed threshold.

Figure 4G:
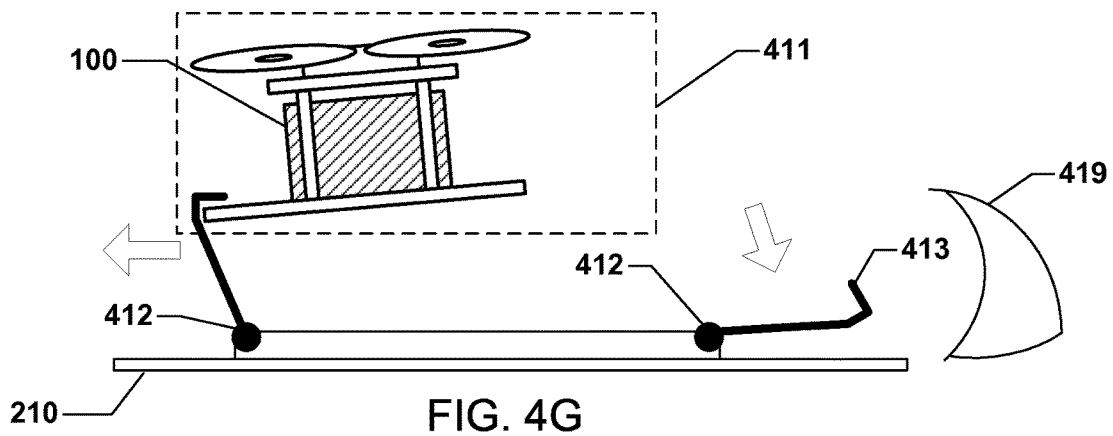
Figure 4H:
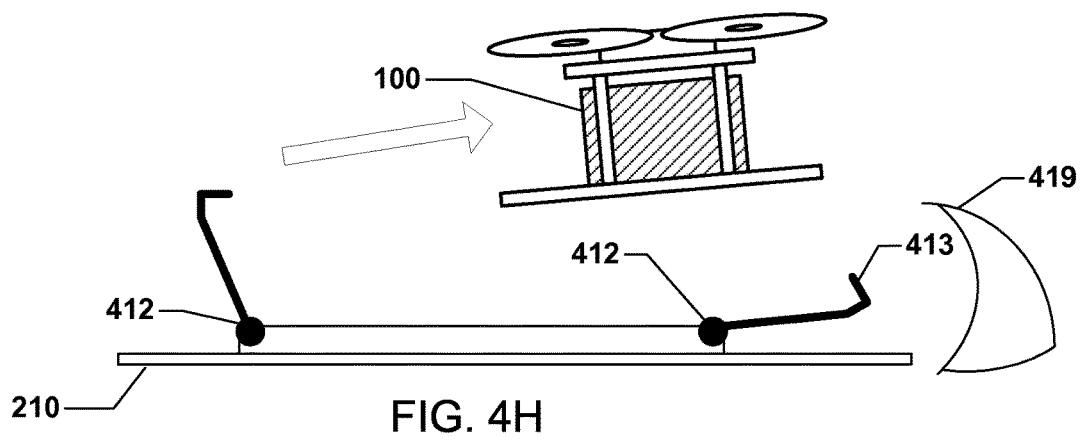

Once the UAV 100 is ready for flight, the front one of the guide arms 413 may be lowered by the corresponding docking motors 412 and the rear one of the guide arms 413 may be fully extended by the corresponding docking motors 412 into a release position (e.g., FIG. 4G). In such a position, the UAV 100 may be placed into the airstream and be ready for embarking in flight (e.g., FIG. 4H). The UAV 100 may move directly toward the destination B or may continue to seek additional vehicles on which to dock. Alternatively, the guide arms 413 may both be activated in the same way and at the same time, or the rear one of the guide arms 413 lowered first.

Figure 5A:
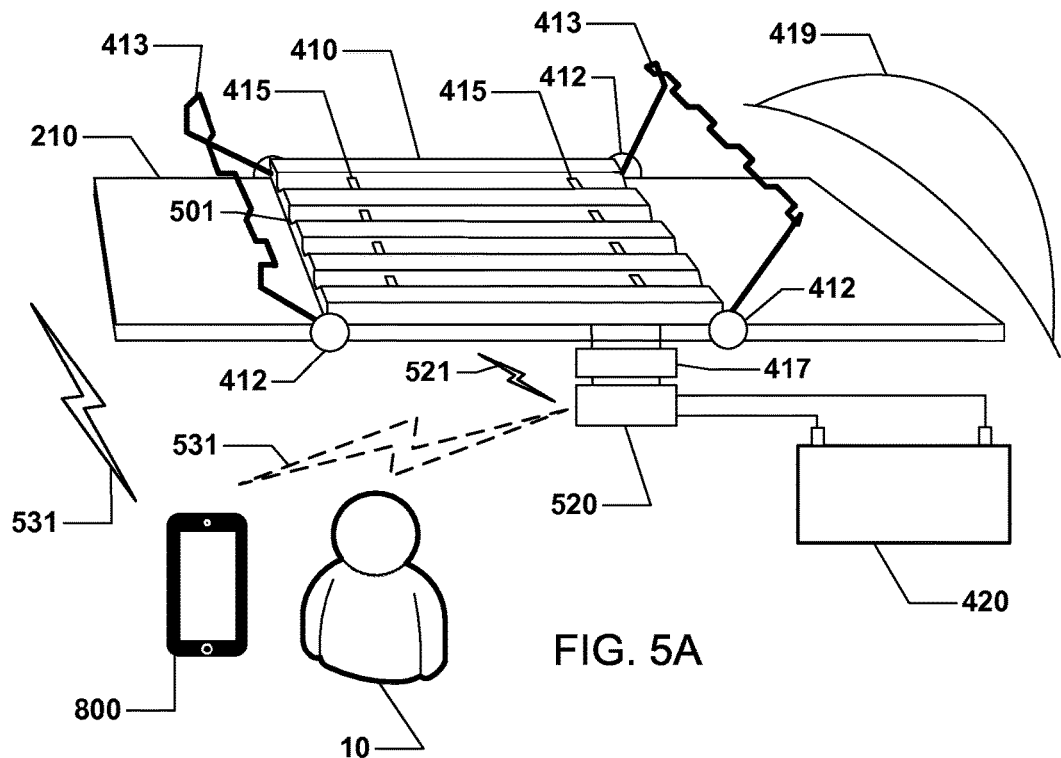
FIG. 5A and FIG. 5B are diagrams illustrating components of a docking system suitable for use with various embodiments.
Figure 5B:
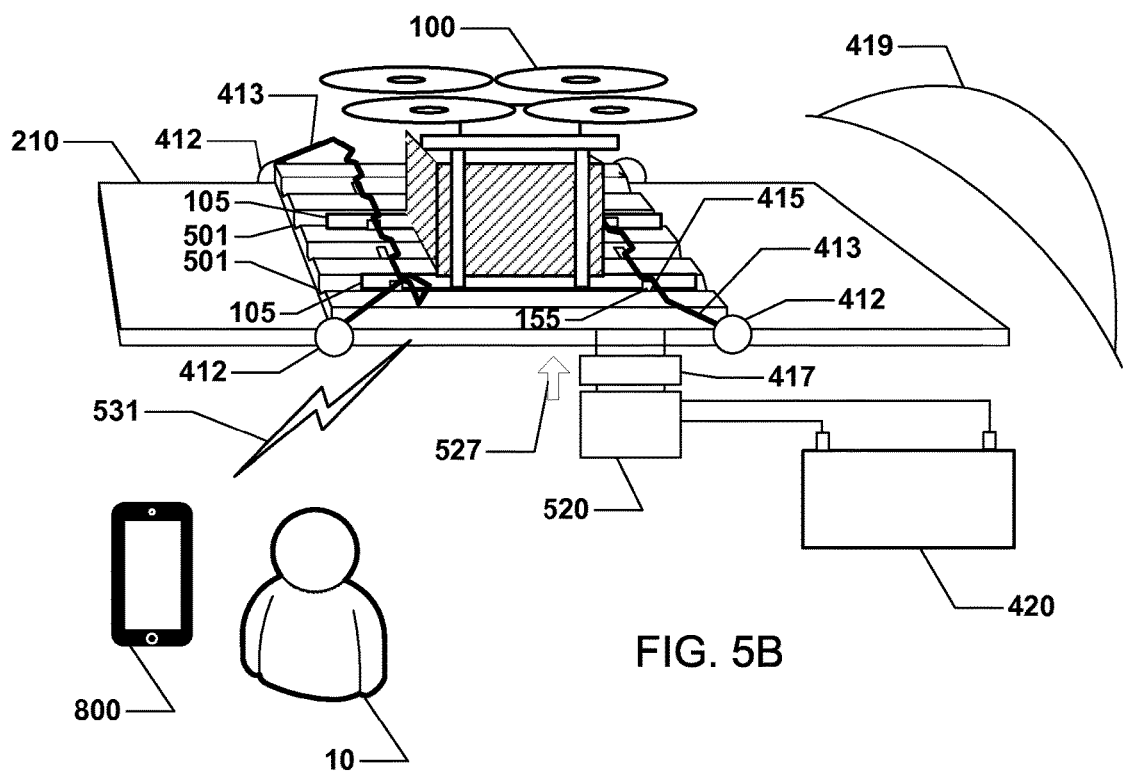

The docking station 410 may be provided with additional mechanisms to facilitate landing, docking, charging and so on as illustrated in FIGS. 5A and 5B. With reference to FIGS. 1A-5B, in various embodiments, the docking station 410 on the motor vehicle 210 may include landing grooves 501 and a docking control unit 520. Further, the docking control unit 520 may function as vehicle-based computing device as described. The docking control unit 520 may communicate with one or more computing devices, such as control unit 110 of the UAV 100 through a short-range wireless connection 521 or with other remote computing devices through an intermediate/long-range wireless connection 531.

If a mobile computing device 800 is present within the motor vehicle 210, such as a smartphone belonging to or being operated by a user 10, the mobile computing device 800 may establish an intermediate/long-range wireless connection 531 with the UAV 100, such as by a Bluetooth or Wi-Fi® link, and optionally with the server 1000, such as through the cellular network infrastructure (e.g., 230). Alternatively or in addition, the mobile computing device 800 may establish the intermediate/long-range wireless connection 531 through a series of ad-hoc wireless connections to one or more of the UAV 100 and the server 1000 through intermediate hops through other computing devices.

In various embodiments, one or both of the mobile computing device 800 and the docking control unit 520 may be executing an application (referred to herein as a "Docking App") that will facilitate communication with the UAV 100. The Docking App may communicate with the UAV (and optionally the server 1000) to facilitate carrying out functions such as docking control, candidate vehicle selection, route tracking, machine to machine (M2M) communication (e.g., UAV to vehicle, UAV to docking station, UAV to mobile computing device, and so on). The Docking App may perform additional functions such as monitoring a UAV charging operation, a docking operation, an undocking operation and other operations. The Docking App may further provide the user 10 with the ability to allow or deny a docking operation request.

For example, in various embodiments, once the UAV 100 is looking for and/or considering candidate vehicles for docking purposes, the UAV 100 may establish communication with the mobile computing device 800 through the intermediate/long-range wireless connection 531. Alternatively or in addition, the UAV 100 may establish communication with the docking control unit 520 through the short-range wireless connection 521 or the intermediate/long-range wireless connection 531. The UAV 100 may query the mobile computing device 800 or the docking control unit 520 for a destination of the motor vehicle 210. The destination information may include a travel route with various route segments, or may simply be a destination point. The UAV 100 may be configured to determine a likely route of the motor vehicle 210 from observation of the current travel route and knowledge of the various possible routes to the specified destination. The UAV 100 may also be configured to determine the relative location of the motor vehicle 210 to the current location of the UAV 100.

Alternatively or in addition, the mobile computing device 800 may communicate with the docking control unit 520 over the intermediate/long-range wireless connection 531 to share information about the route, the status of the docking equipment, and so on. In various embodiments, the mobile computing device 800 may communicate with the docking control unit 520 over the intermediate/long-range wireless connection 531 for the purposes of managing the docking operation and obtaining status information about the docking operation, which may be relayed to the server 1000 if the docking control unit 520 lacks a connection to the UAV 100 or the server 1000. The UAV may also use sensors such as cameras, stereoscopic cameras and ultrasonic sensors for identifying the docking station on the vehicle and for the docking process.

The UAV 100 may execute a docking sequence that may be controlled through the various stages (e.g., FIGS. 4A-4D) by communicating with one or more of the mobile computing device 800 or the docking control unit 520. For example, the docking control unit 520 may operate the docking motors 412 to control the position of the guide arms 413 in order to catch the UAV 100 and draw it into docking position as previously described. As the UAV 100 is drawn toward the docking station 410, such as through operation of the guide arms 413 powered by the docking motors 412, the landing skids 105 may engage with ones of the landing grooves 501. By engaging the landing skids 105 with the landing grooves 501, the UAV 100 may be secured from lateral forces, while the guide arms 413 and the docking motors 412 provide a downward securing force. The downward force provided by the guide arms 413 and the docking motors 412 further brings the charging terminals 155 of the UAV 100 into secure electrical contact with the terminals 415 as illustrated in FIG. 5B.

In various embodiments, once a secure electrical connection may be established between the charging terminals 155 and the terminals 415, the docking control unit 520 may control the charging controller 417 to begin to apply a charging current 527 to charge the battery of the UAV 100 through the charging terminals 155, the terminals 415 and the power supply 420, which may be the battery of the motor vehicle 210. The docking control unit 520 may further report the charging status to one or more of the UAV 100, the mobile computing device 800, or the server 1000. Once charging is complete, the charging current 527 may be reduced or removed through operation of the charging controller 417 under control of the docking control unit 520 and/or the mobile computing device 800. In various embodiments, the charging controller 417 may be configured to operate independently and to report a charging status. In various embodiments, the docking station may facilitate wireless charging for the UAV's battery using technologies such as magnetic resonance like Rezence™.

Once the UAV 100 determines that it should stop piggybacking (e.g., to proceed to the UAV destination or find a better candidate vehicle), such as by determining that an undocking way point has been reached or the destination is close by, an undocking operation may be performed (e.g., FIGS. 4E-4H). The undocking operation may be coordinated through communication and interaction between the UAV 100 and one or more of the docking control unit 520, the mobile computing device 800 and the server 1000.

Figure 6A:
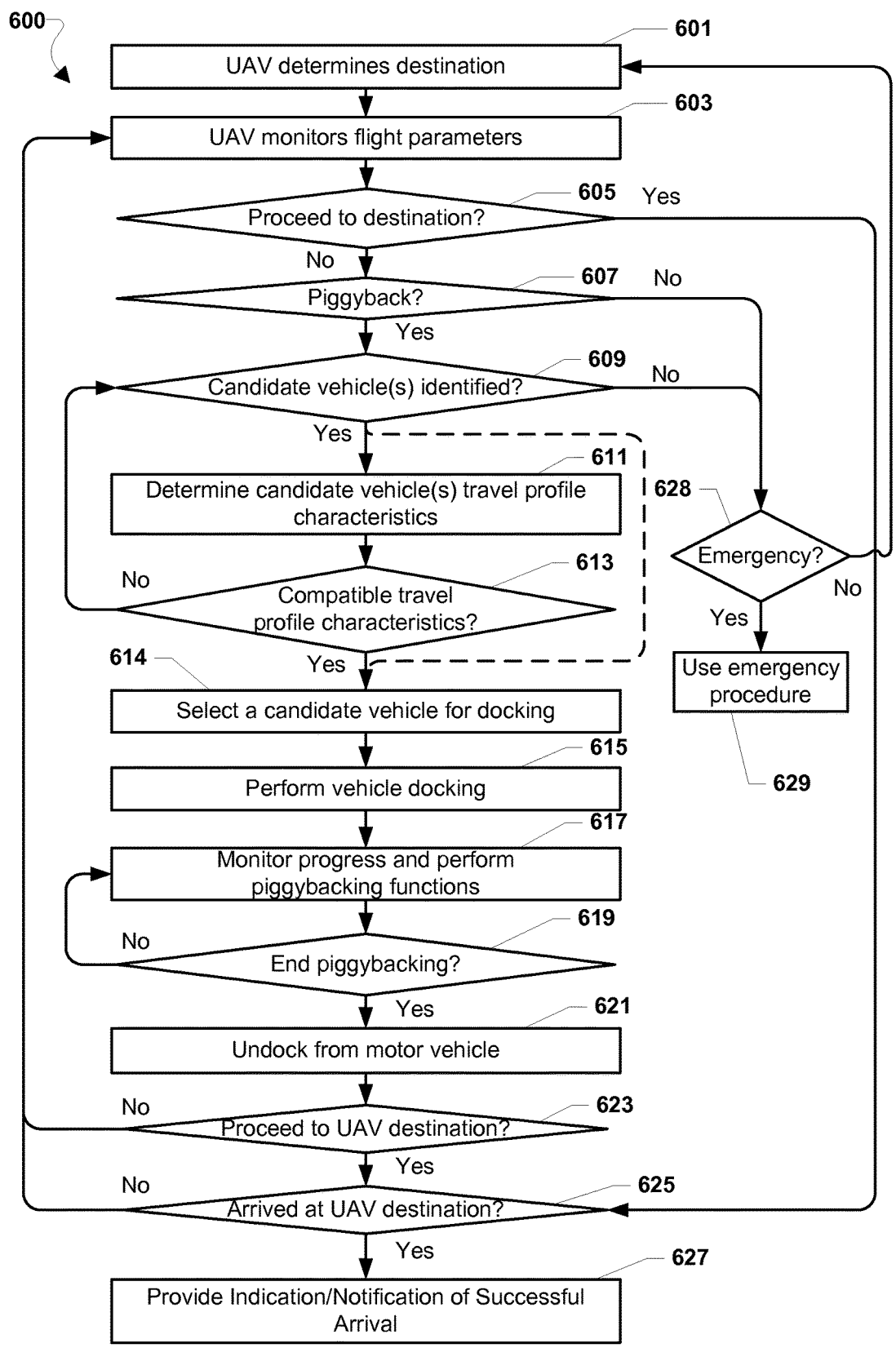
FIG. 6A is a process flow diagram illustrating a method of operating a UAV according to various embodiments.

FIG. 6A illustrates a method 600 for operating a UAV (e.g., 100) according to various embodiments. With reference to FIG. 1A-6A, operations of the method 600 may be performed by a control unit (e.g., 110) or other computing device (e.g., mobile computing device 800 or tablet computing device 900) of the UAV. To perform the operations of the embodiment method 600, the UAV may communicate with the docking control unit 520, the mobile computing device 800, and/or the server 1000 to select a motor vehicle on which to piggyback toward a destination. In block 601, the UAV processor (e.g., 120) may determine a destination of the UAV (i.e., a UAV destination), such as for delivery of a package. The UAV destination may be a fixed street address, a set of GPS coordinates, a series of route segments, or other form of destination information.

In block 603, the processor may monitor flight parameters, such as battery charge level, package weight, wind conditions, flight route, remaining time and distance to destination, and other parameters during flight. As discussed, by monitoring the flight parameters and route, the processor may adjust the route. Further, the processor may receive communications from a server of the delivery service indicating changes to a route, changes to a UAV destination, cancelling of a delivery and so on, that will affect the flight route.

In determination block 605, the processor may determine whether to proceed to the UAV destination. The determination whether to proceed to the UAV destination may be based on the flight parameters monitored in block 603 and available options. In this way, in response to the processor determining the UAV has insufficient onboard power to reach the UAV destination, then the processor may determine not to proceed to the UAV destination. The UAV may not have enough time to reach the UAV destination by a deadline, in which case piggybacking may be elected. Alternatively, piggybacking may have been planned for the UAV to reach the UAV destination timely. In response to determining to proceed to the UAV destination (i.e., determination block 605="Yes"), the processor may direct the UAV to proceed to the UAV destination and monitor whether it has arrived at the UAV destination in determination block 625. In response to determining not to proceed to the UAV destination (i.e., determination block 605="No"), the processor may determine in determination block 607 whether piggybacking should be performed.

In determination block 607, the processor may determine whether to piggyback on a motor vehicle to reach the UAV destination based on the flight parameters monitored in block 603. For example, the battery charge level may be monitored to determine if sufficient battery power is available to complete travel to and return from the UAV destination based on other conditions such as the package weight, current route, wind conditions, and so on. In response to determining not to dock on any motor vehicle (i.e., determination block 607="No"), the processor may determine whether an emergency exists. An emergency may include situations in which the UAV does not have enough power to continue towards the UAV destination, and has to land and/or piggyback to avoid having a dead battery and crashing Another example of an emergency includes when the UAV is in severe weather conditions like a storm, and may no longer be able to keep flying. In response to determining an emergency exists (i.e., determination block 628="Yes"), the UAV may implement (i.e., use) an emergency procedure in block 629. In response to determining an emergency does not exist (i.e., determination block 628="No"), the UAV may return to block 601 to determine a new UAV destination or reassess why the determination was made not to proceed to the earlier UAV destination in determination block 605.

In response to determining to dock on a motor vehicle (i.e., determination block 607="Yes"), the processor may determine whether one or more candidate vehicles have been or may be identified for docking in determination block 609. In this way, the processor may compile a candidate vehicle list. For example, the processor may establish communication with participating vehicles, such as through Docking Apps executing on one or more of in-vehicle devices or mobile computing devices operated by users within the vehicles. Alternatively or in addition, the processor may establish communication with the server and may interact with the server in order to identify candidate vehicles among vehicles participating in the docking service. For example, the server may store information regarding destinations and travel routes for participating vehicles and may identify vehicles to the processor that may have a compatible vehicle destination and a compatible vehicle route.

A list of candidate vehicles identified in determination block 609 may be a preliminary list requiring further assessment with regard to travel profile characteristics in determination block 613 after the travel profile characteristics are compiled in block 611. Alternatively, the list of candidate vehicles identified in determination block 609 may be a more finalized list that includes an order or ranking of the candidate vehicles, so that the process may optionally proceed directly to block 614 to select a candidate vehicle for docking.

In block 611, once communication is established with one or more remote mobile computing devices associated with potential candidate vehicles and/or the server, the processor may determine travel profile characteristics of one or more motor vehicles. Travel profile characteristics may include information selected from a group consisting of a current speed of the candidate vehicle, a type of docking station with which the candidate vehicle is equipped, whether the candidate vehicle is willing to take small deviations from a course or route to allow the UAV to dock, whether the candidate vehicle is willing to slow down to allow the UAV to dock, the maximum UAV weight and/or size the candidate vehicle may accept, traffic conditions, a location of the candidate vehicle, a designated destination of the candidate vehicle, a designated route of the candidate vehicle, contextual information from which an inferred destination or route may be determined by the processor. The processor may obtain travel profile characteristics for some candidate vehicles from one type of source (i.e., a mobile computing device) and travel profile characteristics for other candidate vehicles from a different type of source (e.g., a server).

In determination block 613, the processor may determine the candidate vehicles for which travel profile characteristics were determined in block 611 that has one or more travel profile characteristics that help the UAV to reach the UAV destination (i.e., compatible travel profile characteristics). In this way, the processor may determine whether the motor vehicle destinations, travel routes, and other information render each of the candidate vehicles acceptable to be selected for docking.

In response to determining that at least one of the candidate vehicles has one or more travel profile characteristics that help the UAV to reach the UAV destination (i.e., determination block 613="Yes"), the processor may select a vehicle for docking in block 614. In response to determining that no candidate vehicle has travel profile characteristics that help the UAV to reach the UAV's destination (i.e., determination block 613="No"), the processor may once again identify one or more candidate vehicles for docking in determination block 609, removing the incompatible candidate vehicles determined in determination block 613, and determine a new set of travel profile characteristics for a new set of candidate vehicles in block 611.

In addition, when the processor is once again identifying one or more candidate vehicles for docking in determination block 609, the processor may reduce the number of parameters needed to satisfy requirements for piggybacking. In this way, the UAV may speed-up the evaluation of candidate vehicles or broaden the number of candidate vehicles that have compatible travel profile characteristics. For example, as part of a first round of identifying and assessing candidate vehicles a docking station may be a requirement, whereas as part of a second round a docking station may be optional.

In block 614, the processor may select a candidate vehicle from those candidate vehicles determined to have one or more travel profile characteristics that help the UAV to reach the UAV destination. The processor may select one of the vehicles for docking based on prioritizing or ranking candidate vehicles by a comparative evaluation of the travel profile characteristics such as the vehicle route, travel time, weather conditions, and so on.

In various embodiments, the selection may be made based on an evaluation of basic factors, such as whether a candidate vehicle will provide the fastest time to the UAV destination. When basic factors such as time to destination, are the same for two or more candidate vehicles, other factors may be considered when selecting a vehicle for piggybacking. For example, when two or more candidate vehicles provide the same or comparable times to the destination, the processor may consider that one of the two or more vehicles is willing to allow piggybacking without requiring an incentive. In such a case, it may be cost-effective to select the vehicle that does not require an incentive for piggybacking. Other criteria for ranking candidate vehicles may include a credibility/trustworthiness of the candidate vehicle. The credibility/trustworthiness may be based on a percentage of successful previous dockings over a period of time, customer reviews, automated UAV feedback based on a set of parameters, such as time to dock, and/or how often the driver does deliver on his commitment to maintain route. In this way, a ranking mechanism may be used to rate the quality of each of the candidate vehicles.

In block 615, the UAV may initiate a flight path toward the select vehicle and once in proximity dock with the select vehicle. The docking operation may involve additional procedures (e.g., as described in greater detail with reference to FIG. 7).

In block 617, once the UAV is docked, the processor may monitor and/or continue to monitor the UAV's progress toward the UAV destination. By monitoring the UAV's progress towards the UAV destination, the processor may also monitor the progress of the vehicle, on which the UAV is piggybacking, toward the UAV destination. For example, the processor may monitor the movement of the UAV and/or the vehicle on which the UAV is docked for progress towards the UAV destination since they are moving together during docking. The processor may monitor internal navigation information, such as GPS information about the current position of the docked UAV.

Alternatively or in addition, the processor may obtain position information from communication with one or more of the server, in-vehicle device, or a mobile communication device within the vehicle. For example, by monitoring its GPS position the processor may detect deviations from the planned route, recognize delays from an expected travel time, and recognize when it has started traveling away from its UAV destination, each of which may affect a decision to remain docked on the present vehicle.

Additionally in block 617, while docked on the motor vehicle, the UAV may perform additional piggybacking functions, such as recharging onboard batteries. Such battery recharging may be accomplished by receiving power from the motor vehicle (e.g., through charging terminals 155). Alternatively, the UAV may harvest energy using the processor and/or a power regulator to configure the flight motors (e.g., 160) to generate electricity for recharging the battery as the apparent wind created by the vehicle's travel causes the rotors to spin. The UAV may also have additional equipment that may orient the rotors to face or pitch toward the wind in order to increase the efficiency of wind-energy harvesting. Such charging of the battery may continue as long as the UAV remains docked on the vehicle and the vehicle or air around the vehicle is moving, or until the battery is fully charged.

Further in block 617, while docked on the motor vehicle, the processor may consider whether another candidate vehicle may be available and may be a better option to assist the UAV in reaching the UAV destination. If the UAV determines another motor vehicle would be better for piggybacking at a particular time, the processor may determine the present piggybacking segment has ended.

In determination block 619, the processor may determine whether the present piggybacking segment or docking operation should end. For example, the processor may determine that a waypoint has been reached, the destination is close, the vehicle is now traveling away from the destination, or conditions associated with the current docking state have become undesirable for continued docking. In the event that docking was initiated in order to charge the UAV battery (e.g., by using the apparent wind passing over the UAV to generate electricity using the flight motors as generators or by using a power source from the motor vehicle), a determination that piggybacking is complete may be made once the battery is sufficiently recharged. In response to determining that the piggybacking should not end (i.e., determination block 619="No"), the processor may continue to monitor progress and perform piggybacking functions in block 617.

In response to determining that the present piggybacking segment is complete (i.e., determination block 619="Yes"), the processor may prepare for and undock from the select vehicle in block 621. The undocking operation may involve additional procedures (e.g., as described with reference to FIG. 7).

In determination block 623, once the UAV is undocked from the select vehicle, the processor may determine whether to continue to the UAV destination. In this way, the processor may control the UAV to proceed to the UAV destination or determine whether to dock with another motor vehicle. The processor may be configured to continuously monitor the progress towards the destination under all circumstances. For example, in proceeding toward the destination, the processor may take into account various factors such as changes in the expected route of a vehicle, or other circumstances such as weather conditions and so on using information gathered from a variety of sources both internal and external to the UAV.

In response to determining that the UAV should not proceed to the UAV destination (i.e., determination block 623="No"), the processor may once again monitor flight parameters in block 603 and determine whether to proceed to the UAV destination in determination block 605. In response to determining that the UAV should proceed to the UAV destination (i.e., determination block 623="Yes"), the processor may proceed to the UAV destination and determine whether the UAV has arrived at the UAV destination in determination block 625.

In determination block 625, the processor may determine whether the UAV has arrived at the UAV destination. The processor may determine arrival based on internal GPS information that coincides with the GPS information of the destination. Alternatively or in addition, the processor may obtain information regarding arrival from communication with one or more of the server, the in-vehicle device, or the mobile computing device located within the vehicle, or at the UAV destination (such as the mobile computing device of the package recipient). In response to determining that the UAV has not yet arrived at the destination (i.e., determination block 625="No"), the processor may once again monitor flight parameters in block 603 and determine whether to proceed to the UAV destination in determination block 605.

In response to determining that the UAV has arrived at the destination (i.e., determination block 625="Yes"), the processor may provide a notification or indication of successful arrival in block 627. For example, the processor may communicate with one or more of the server, and with a mobile communication device of the package recipient that the package has successfully arrived. Upon arrival at the destination, the processor may perform additional operations, such as operations to ensure that the package is successfully detached and taken into possession by the recipient. The processor may then execute its return flight, which may again involve piggybacking. Thus, on the return trip, the processor may determine a new UAV destination (i.e., the UAV home base) in block 601, monitor flight parameters in block 603, and determine whether to proceed to the UAV destination in determination block 605 as described above.

Figure 6B:
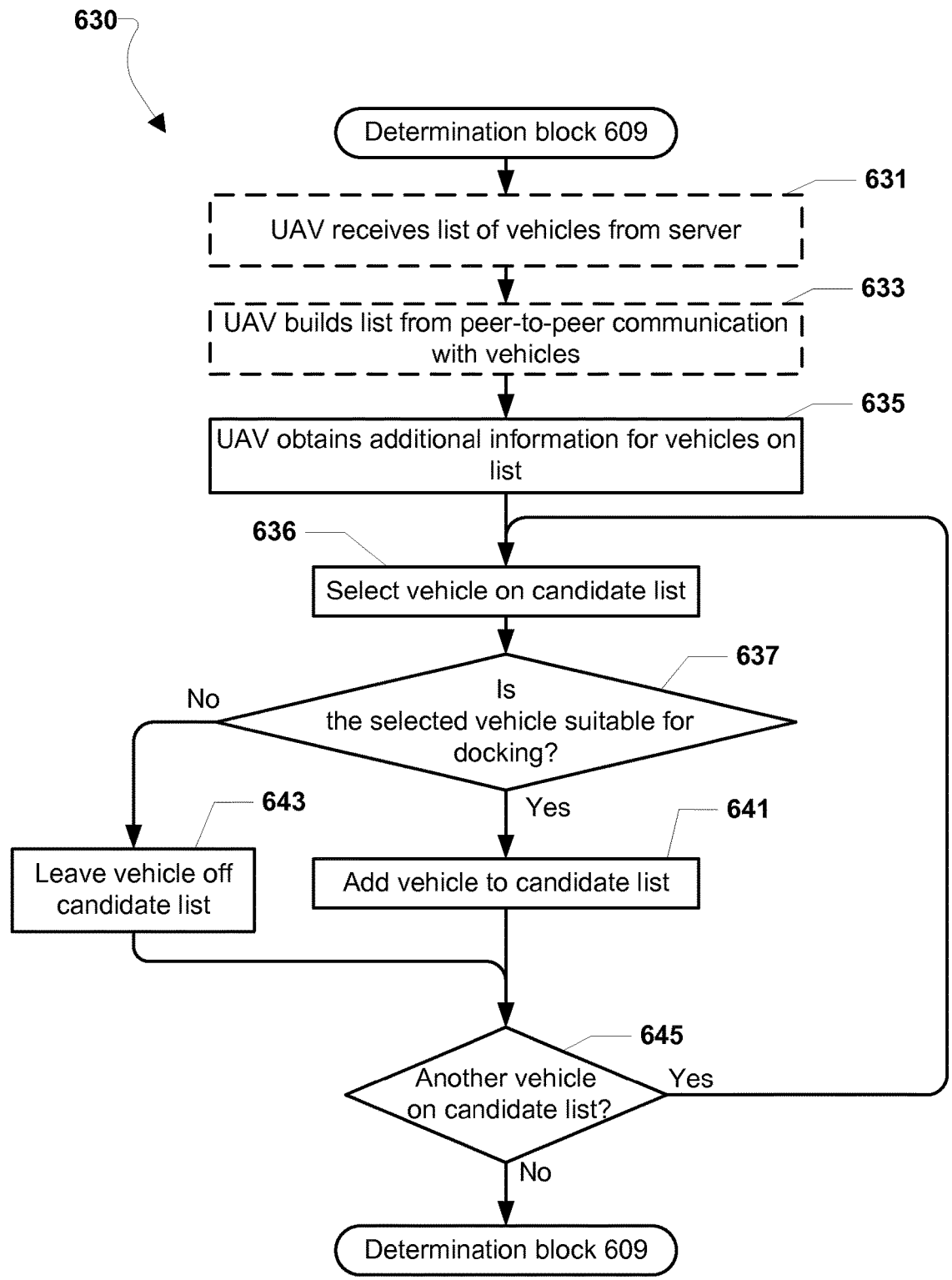
FIG. 6B is a process flow diagram illustrating a method of selecting a vehicle from one or more candidate vehicles according to various embodiments.

FIG. 6B illustrates a method 630 of operations that may be implemented as part of determination block 609 of the method 600 for determining whether one or more candidate motor vehicles have been identified for piggybacking according to some embodiments. With reference to FIG. 1A-6B, a control unit (e.g., 110) or other computing device (e.g., mobile computing device 800) may perform the operations of the method 630.

In optional block 631, the processor may receive a list of vehicles that may be suitable for selection as candidate vehicles from a central server or more than one server, which may belong to different service providers or organizations. The processor may have previously requested the list of vehicles or the server may have transmitted the list of vehicles without a formal request (i.e., automatically). The server may have information about the current location of the UAV and the relative locations and capabilities of vehicles within a certain geographic radius of the UAV. The server may produce a general list of vehicles that are suitable based on the location of the UAV and the locations of vehicles registered to permit UAV docking and reporting their positions to the server. The server may generate a general list of vehicles that are within a first threshold distance of the UAV (e.g., within five miles or ten minutes flying time of the UAV) and provide the general list to the UAV processor through a communication link (e.g., a cellular wide area network). The server may also provide information to the UAV regarding vehicle speeds and directions, traffic conditions, and weather (e.g., wind speed and direction).

In generating the list the server may take into account information about the UAV, such the current location of the UAV, the maximum flying speed of the UAV, the destination location of the UAV, the return location of the UAV and other information. The server may further refine the list of vehicles based on information related to vehicle capabilities and driver agreements, such as by including in the list only those vehicles that allow delivery UAVs to piggyback. The server may further refine the general list of vehicles to include in the list only those vehicles that are within a given flying distance or flying time from the UAV (which may consider current weather conditions), and/or are traveling in a direction or towards a destination that is compatible with the UAV's route and/or destination (i.e. delivery destination or return destination). The server may obtain information regarding various vehicle routes or destinations based on knowledge of the vehicle's typical travel route, a designated route for the vehicle, contextual information, and so on. For example, the server may determine from historical records it may maintain that every Tuesday the vehicle makes a trip to a certain destination, which may enable the server to presume that the vehicle is heading toward the usual Tuesday destination when it receives a report that the vehicle is on the road on Tuesday. Other contextual information may be used by the server, such as contextual information obtained from social media databases and other sources, including a vehicle's trustworthiness/rating.

In optional block 633, the UAV processor may alternatively or additionally build a list of vehicles itself using information obtained from cellular or peer-to-peer communication links with in-vehicle devices, or devices of occupants in the vehicles within peer-to-peer communication range. The processor may optionally supplement a list received from a server in optional block 631 with information received via peer-to-peer communications with in-vehicle devices or devices of occupants. The processor may communicate with the in-vehicle devices or devices of occupants to obtain the same or similar information as that may be obtained from a server in optional block 631, additional information, or updated information. Further, the processor may communicate with the vehicle devices to obtain information about the location and destination of each vehicle, their receptivity to UAV docking, and so on. The processor may also infer destination information from contextual information as described above in connection with optional block 631.

In block 635, the UAV may obtain additional information from in-vehicle devices or devices of occupants on the list obtained in optional block 631 or optional block 633. Such information may be obtained via cellular or peer-to-peer communication links between the UAV processor and the vehicle devices. Non-exhaustive and non-limiting examples of additional information include: the current speed of the vehicle; the type of docking station that the vehicle is equipped with; whether the vehicles is willing to make small deviations in its course or route to allow the delivery vehicle to dock; whether the vehicle is willing to slow down to allow the delivery UAV to dock; environmental conditions (e.g., wind speed, rain, obstructions, tunnels, etc.); the maximum UAV weight and/or size the candidate vehicle may accept; the package weight; the package size; the UAV weight; the UAV dimensions; the lading conditions of the UAV (laden/unladen); and other information.

With a list of candidate vehicles generated, the UAV processor may evaluate the vehicles in the list in order to remove those vehicles with which docking would not be physically or practically possible (e.g., too far away, up wind of the UAV, etc.) or incompatible with the UAV's destination (e.g., headed in the wrong direction). As an example, the UAV processor may select a vehicle from the candidate list in block 636, and determine whether the select vehicle is suitable for rendezvous and docking in determination block 637. In making this evaluation, the processor may take into account all information from the vehicles, such as the information from optional block 631, optional block 633, and block 635 in order to consider the suitability of the vehicle for docking and thus considering the vehicle as a candidate. For example, the processor may disqualify a vehicle as suitable for docking in determination block 637 upon determining that the UAV will not be able to dock with the vehicle based on information obtained from in-vehicle devices or devices of occupants, the UAV's own location and weather conditions. For example, if weather conditions (e.g., received from a weather data service) indicate a strong Easterly wind, and the vehicle is positioned to the east of the UAV and traveling in a direction and at a speed would preclude the UAV from catching up to the vehicle flying at its maximum airspeed, the processor may determine that the vehicle is not suitable for docking (i.e., determination block 637="No") and leave the vehicle off a list of candidate vehicles in block 643.

In response to determining that a vehicle in the list is suitable for docking (i.e., determination block 637="Yes"), the processor may add the vehicle to the candidate list in block 641. The processor may repeat the selection and evaluation for each suitable vehicle by determining whether there is another vehicle on the general list in determination block 645, and selecting the next vehicle on the list for evaluation in block 636 when there is (i.e., determination block 645="Yes").

In response to determining that the select vehicle is not suitable for docking (i.e., determination block 637="No"), the UAV processor may leave the vehicle off of the candidate list in block 643. Again, the processor may repeat the selection and evaluation for each vehicle on the general list by determining whether there is another vehicle on the general list in determination block 645, and selecting the next vehicle on the list for evaluation in block 636 when there is (i.e., determination block 645="Yes"). Alternatively, the processor may truncate the evaluation once at least one suitable vehicle is found for the candidate list. The processor may base the decision to truncate the evaluation on factors such as the urgency of the need to piggyback (e.g., low battery condition, weather, etc.).

Once all vehicles in the general list have been evaluated (i.e., determination block 645="No"), the UAV processor may continue as described above following determination block 609 of method 600 with reference to FIG. 6A.

In various embodiments, owners of motor vehicles may sign up to provide piggybacking or docking services to UAVs, and may indicate in their sign up that the driver is willing to slow down, stop or change course in order to allow a delivery UAV to dock (and un-dock). For example, a delivery UAV service provider may offer incentives to vehicle owners for providing piggybacking or docking services to its UAVs, providing financial or other incentives for drivers to slow down or deviate from their route to enable the UAV to dock with their vehicle. For example, if the vehicle's owner is willing to make small deviations in the course or slow down in consideration for such incentives, the owner may configure their in-vehicle device or smart phone to communicate such information to the UAV and receive docking requests (such as requests to slow down or stop) from delivery UAVs. Upon receiving such a docking request from a UAV, the in-vehicle device or smart phone may communicate conditions to the processor under which the driver will be willing to accept docking, slow down for docking, deviate from an existing course for a hitch hiking UAV and so on. The UAV processor may respond to such conditions with a refined docking request.

Also, the in-vehicle device or smart phone may alert the driver and provide a display of instructions (e.g., to slow down, take the next exit, or stop) that the driver should follow in order to enable the UAV to dock with the vehicle. Such exchange of information between the UAV processor and the in-vehicle device or driver's smart phone may be accomplished as part of the operations in optional block 631, optional block 633, and/or block 635, and the driver's willingness to stop, slow down, and/or turn to enable UAV docking may be evaluated in determining whether a vehicle is suitable for docking in determination block 637.

In various embodiments, the primary purpose of a motor vehicle may be to carry delivery UAVs (e.g., a motor vehicle operated by the delivery UAV service provider). In such embodiments, a motor vehicle whose primary purpose is to carry delivery UAVs may be configured to always accept small deviations or requirements to slow down to allow a UAV to piggyback, whenever possible (e.g., when the motor vehicle is not already carrying a UAV). Such delivery UAV service provider vehicles may be capable of carrying multiple UAVs. In such embodiments, motor vehicles dedicated to carrying delivery UAVs may be given enhanced consideration or weight in determining their suitability for docking (e.g., in determination block 637) compared to other motor vehicles in the vicinity. For example, if there is a motor vehicle whose primary purpose is to carry delivery UAVs on the general list and that motor vehicle is traveling in a direction compatible with the delivery UAV's destination, that motor vehicle may be added to the candidate vehicle list in block 641 while all other motor vehicles on the general list are excluded from the candidate vehicle list in block 643 (i.e., all other motor vehicles will be determined unsuitable for docking in determination block 637). However, if there is a motor vehicle whose primary purpose is to carry delivery UAVs on the general list but that motor vehicle is too far away or traveling in a direction incompatible with the delivery UAV's destination (i.e., determination block 637="No"), that motor vehicle may not be added to the candidate vehicle list in block 643.

In addition, some motor vehicles suitable for piggybacking may be partially or completely autonomous motor vehicles (self-driven). When this is the case, various operations performed on the part of the autonomous motor vehicle may be automatic (without a human interface or human intervention). A fully autonomous motor vehicle may not need any human interaction to dock with a UAV or enable the UAV to dock with the autonomous motor vehicle. The primary purpose of such dedicated autonomous motor vehicles may be to carry one or more UAVs. Thus, the dedicated autonomous motor vehicle may be pre-configured to always allow UAVs to dock on them if space is available. In addition, the dedicated autonomous motor vehicle may use other logic that suits the business plan followed by the candidate vehicle provider to allow certain UAVs to dock while other UAVs may not.

In various embodiments, the operations of determination block 609 may be repeated regularly or periodically to add vehicles to and remove vehicles from the list and periodically triage the general list to a list of candidate vehicles as the UAV moves towards its destination. The processor may periodically refer to the candidate list as it moves towards the UAV destination to determine whether there is a better motor vehicle with which to dock (e.g., by performing the operations of block 617). In addition, prior to undocking from a motor vehicle the UAV processor may perform the operations from determination block 619 and/or the method 630 to reevaluate and update vehicles on the list of candidate vehicles.

Figure 7:
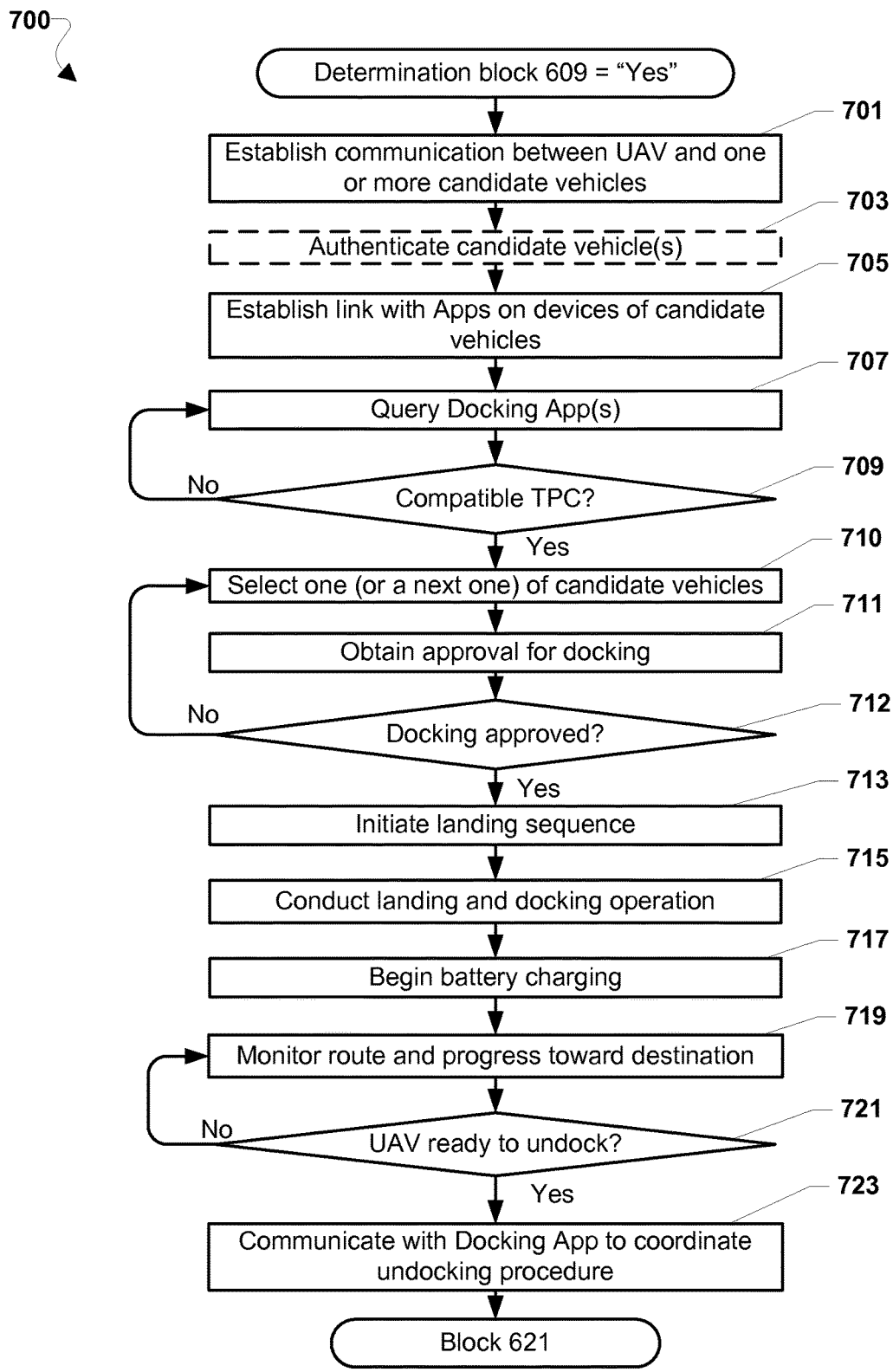
FIG. 7 is a process flow diagram illustrating a method of operating a UAV according to various embodiments.

A method 700 for operating a UAV is illustrated in FIG. 7. With reference to FIGS. 1A-7, the method 700 provides an alternative process for identifying candidate vehicles and piggybacking that may be substituted and/or combined with portions of the method 600, as illustrated in FIG. 6A.

In particular, in response to determining that one or more candidate vehicles have been identified (i.e., determination block 609="Yes"), the processor may establish communication with the one or more candidate vehicles in block 701. The communications may be basic discovery oriented communications enabling the processor to find compatible candidate vehicles. In various embodiments, the processor may establish communications with a server of the package delivery service, a vehicle docking service, a UAV operator service and so on, to determine candidate vehicles and their current locations and destinations.

Candidate vehicles may include vehicles that are configured to provide UAV docking, such as by being equipped with a UAV docking mechanism, in-vehicle devices, mobile computing devices and so on. In various embodiments, the candidate vehicles may register their availability with the server through interaction between a Docking App executing on the in-vehicle device, the mobile computing device or through direct access to a server through a web portal. In some embodiments, the Docking App from a vehicle-based device may operate partially or completely autonomously without any human interaction, using pre-configured logic that is suitable for the adopted business plan.

In optional block 703, in response to the processor having established communications with candidate vehicles and/or a server, for security purposes the processor may optionally authenticate the candidate vehicles for providing a docking service. Authentication may take many forms such as exchange of a key, provision of a code, or other authentication mechanism.

Once the processor has authenticated communication with the candidate vehicles, the processor may establish links with the Docking Apps on one or more of the in-vehicle devices or the mobile computing devices within the vehicle in block 705. The links may be wireless communication links between the UAV RF modules and the RF modules on the in-vehicle devices or the mobile computing devices inside the candidate vehicles, such as through the Docking App and appropriate wireless communication protocol. The links may allow data and commands or messages to be exchanged between the processor and the devices within the candidate vehicles. The processor may be configured to manage multiple communication links. The communications link may be established through public cellular networks as well.

In block 707, the processor may query the mobile devices associated with the candidate vehicles or the Docking Apps executing on the devices regarding travel profile characteristics, such as the destinations of the candidate vehicles. The destination information may be a fixed address, a set of GPS coordinates, a named destination, or other information. The Docking App may query other applications on the device, such as social media applications, map applications, navigation applications or other applications in an attempt to determine travel profile characteristics.

The travel profile characteristics may be obtained contextually through a social media post, a text message, or other context based source. For example, a text message to a contact on the mobile computing device of an occupant in a candidate vehicle may reveal that the vehicle is heading toward a meeting with the contact, whereupon the context may indicate that the contact's address is the vehicle destination. The mobile computing device may also "learn" behavioral habitual patterns and routines of the occupant and make educated guesses on the travel profile characteristics. For example, if the occupant regularly uses the candidate vehicle to commute to work on weekdays, based on the time and day, the device can guess if the vehicle is travelling to occupants work address or his home address. In some embodiments, a user interface associated with the Docking App may allow a user within a candidate vehicle to enter the travel profile characteristics of the candidate vehicle, which may then be passed to the processor through the communication link.

In determination block 709, the processor may determine whether travel profile characteristics (TPC) of one or more of the candidate vehicles are compatible with the UAV destination. Determining the travel profile characteristics may include obtaining information associated with the vehicle destination over a communication link and comparing the obtained information with information about the UAV destination. Compatible travel profile characteristics may include a destination or a vehicle route that are along or close to the UAV route of the UAV towards its UAV destination. The compatible travel profile characteristics may include a destination that provides a partial route segment toward the UAV destination that is compatible with the UAV route. The processor may build a list of travel profile characteristics and corresponding candidate vehicles for later reference. In response to determining that travel profile characteristics of one or more candidate vehicles are not compatible with the UAV destination for the UAV (i.e., determination block 709="No"), the processor may continue to query the devices associated with the vehicle until one or more candidate vehicles with compatible travel profile characteristics is found.

In response to determining that travel profile characteristics of one or more candidate vehicles are compatible with the UAV destination (i.e., determination block 709="Yes"), the processor may select one of the candidate vehicles for docking in block 710. For example, the processor may select a candidate vehicle with a destination that is most compatible with the UAV destination, such as a vehicle destination that has a compatible proximity to the UAV destination of the UAV. The processor may further consider the proximity of the one or more candidate vehicles to the current location of the UAV. In addition, the processor may consider the availability of a charging dock as another criterion, or the credibility of the driver, vehicle, or the service operating the vehicle as described. Alternatively or in addition, once the UAV lists the candidate vehicles, the list may be ordered according to compatibility and the processor may select the first or next vehicle in the list.

In block 711, once one of the candidate vehicles is selected for docking, the processor may obtain approval for docking from one or more of the in-vehicle device or the mobile computing device within the vehicle. For example, the processor may communicate with the Docking App to obtain approval for docking. Although an in-vehicle device or a mobile computing device may have previously registered its availability for docking, a change in condition may cause approval to be withheld at the time docking is required. A user interface associated with the Docking App may allow a user within the select vehicle to allow or deny docking by activating a user interface hardware or software button. The selection may be passed to the processor through the communication link.

In determination block 712, the processor may determine whether docking is approved. In response to determining that docking is not approved (i.e., determination block 712="No"), the processor may select another candidate vehicle in block 710 and request approval to dock in block 711.

In response to determining that docking has been approved (i.e., determination block 712="Yes"), the processor may initiate a landing/docking sequence in block 713. The landing sequence may involve several procedures such as the processor controlling the UAV to a rendezvous point with the candidate vehicle where docking may be performed. The rendezvous point may be a stationary point or may involve landing/docking on a moving vehicle. The landing sequence may further involve docking preparations on the candidate vehicle such as placing guide arms of a docking mechanism in an open or UAV catching position.

The processor may communicate information such as battery charge state, destination, package weight, and other information prior to landing. Alternatively or in addition, such information may be provided prior to obtaining docking approval so that information, such as the package weight, may be used by the candidate vehicle to determine approval. In various embodiments, the candidate vehicle may have the option to change its own destination to match that of the UAV destination for the UAV. Such a change may be an incentive through additional compensation provided by the delivery service, the UAV operator service, the package recipient, and so on, or a combination thereof.

In block 715, the processor may conduct a landing and docking operation (e.g., by executing the sequence of operations illustrated in FIGS. 4A-4D). To facilitate the landing and docking operation, the processor may coordinate with one or more in-vehicle devices, such as a docking control unit, a mobile communication device, or a combination thereof. For example, the processor may control the UAV into a first position against a catching guide arm. Once the processor detects that the catch is successful, such as through coordinated feedback from the vehicle devices, the processor may reduce a lift on the rotors to allow the UAV to be lowered onto the docking mechanism. The processor may further detect once docking is complete and the skids of the UAV are securely engaged with the docking mechanism. In some embodiments, the processor may also detect once charging terminals are in contact with corresponding terminals of the docking mechanism.

In block 717, the processor may begin battery charging. In some embodiments, battery charging may be accomplished by harvesting apparent wind energy by configuring flight motors to function as generators turned by the attached rotors. The UAV may additionally include equipment that enables the rotors to adjust pitch, configuring the rotors to face the apparent wind in order to increase the efficiency of wind energy harvesting. In some embodiments, battery charging may be accomplished by receiving electric power from the vehicle through electrical contacts in the docking mechanism. In embodiments in which battery charging is accomplished using power supplied by the vehicle, the processor may communicate with the devices in the vehicle to energize the charging terminals in the docking mechanism such that a charging current may be provided through the terminals of the docking mechanism by a charging circuit on the docking mechanism. The processor may communicate with the devices in the vehicle regarding the state of charge of the UAV battery. Charging may continue until the UAV battery is fully charged, whereupon the charging current may be reduced or removed. In various embodiments, the docking station may facilitate wireless charging for the UAV's battery using technologies such as magnetic resonance like Rezence™.

In block 719, while docked, the processor may continue to monitor the UAV location and the progress of the docked UAV/vehicle towards the UAV destination. The processor may monitor internal navigation information, such as information from a GPS module associated with the UAV. Alternatively or in addition, the processor may communicate with devices in the vehicle to obtain position or navigation information. The processor may further monitor communications from one or more of the server, the in-vehicle device, or mobile computing device for any changes to the destination of the vehicle that may require undocking. Further, during docking, the processor may continue to communicate with other vehicles to determine whether another candidate vehicle may have a more compatible destination or may have a faster route towards the UAV destination.

In determination block 721, the processor may determine whether undocking is necessary based on monitored route information, location information, navigation information, and so on. For example, based on the monitored location information, the processor may determine that it has reached a way-point, is close to its destination, or that another vehicle may have a superior route towards the UAV destination, and may designate an undocking point. In response to determining that the vehicle is not near an undocking point (i.e., determination block 721="No"), the processor may continue to monitor the location and progress towards the destination in block 719.

In response to determining that the vehicle is near an undocking point (i.e., determination block 721="Yes"), the processor may communicate with the Docking App executing on one or more vehicle-based device to coordinate undocking in block 723. In addition in block 723, the processor may determine whether conditions are safe and/or appropriate to undock (e.g., the motor vehicle is not inside a tunnel, under a bridge, in a no-fly zone, or in extreme weather conditions). In block 621, the processor may conduct an undocking/disembarking operation (e.g., as described with reference to FIGS. 4E-4H).

To facilitate the undocking/disembarking operation, the processor may coordinate with one or more of the in-vehicle device, which may include a docking control unit as described herein, the mobile communication device or a combination thereof. In an initial undocking stage, the docking mechanism may release downward force on the guide arms through operation of the control motors and release the UAV into a first position where the UAV is still secured, but may be under power. The processor may detect once initial undocking is complete and the skids of the UAV are disengaged with the docking mechanism, and the charging terminals are no longer in contact with the terminals of the docking mechanism. The processor may detect that movement into the initial undocking position is successful, such as through coordinated feedback from the vehicle devices. The processor may increase a lift on the rotors to allow the UAV to embark once fully released from the docking mechanism. The processor may then instruct and/or confirm that the docking mechanism lowers a forward guide arm, while maintaining a rear guide arm in a supporting position to allow embarkation. The processor may then control the UAV into flight away from the docking mechanism. Before controlling the UAV to fly away from the motor vehicle, the processor may check one or more external parameters to ensure the UAV will be safe or not enter dangerous conditions.

As noted, the process of piggybacking on vehicles may conserve battery power, recharge onboard batteries of the UAV, and speed travel to the UAV destination. In this way, piggybacking may be implemented on an initial trip (i.e., departing from a home base of the UAV) as well as on the return leg (i.e., a return to the home base). In addition, the UAV destination may be an intermediate destination and need not be a final stop or trip of the UAV. Thus, references to a "UAV destination" are for example purposes only and are not intended to limit the scope the claims to only the outbound phase of travel by the UAV or travel to a final destination.

Although various embodiments described herein include the UAV piggybacking on motor vehicles specially prepared for UAV piggybacking, the same principles may be used for the UAV to piggyback on non-customized motor vehicles, such as trucks, busses, van, boats, trains, or other aerial vehicles capable of carrying the UAV for piggybacking. Non-customized motor vehicles may be particularly applicable to ad-hoc piggybacking or in emergency cases when UAV power reserves are low and/or no suitable piggybacking motor vehicles are available. The UAV may attach itself to the top of a non-customized motor vehicles going along the same route, and the UAV may recharge onboard batteries using energy harvesting techniques. In an emergency, the UAV may also opt to land on a safe spot on the ground (e.g., pre-designated or non-designated areas near roads, parking lots, or building tops) and continue searching for candidate vehicles, conserve power, and/or harvest energy.

The docking procedures of the various embodiments need not always involve coordination between the UAV, the server, and/or selected candidate vehicle. In an emergency or for some ad-hoc situations, the UAV may dock or land on motor vehicles without communicating or getting prior approval from the motor vehicle or passengers therein.

Figure 8:
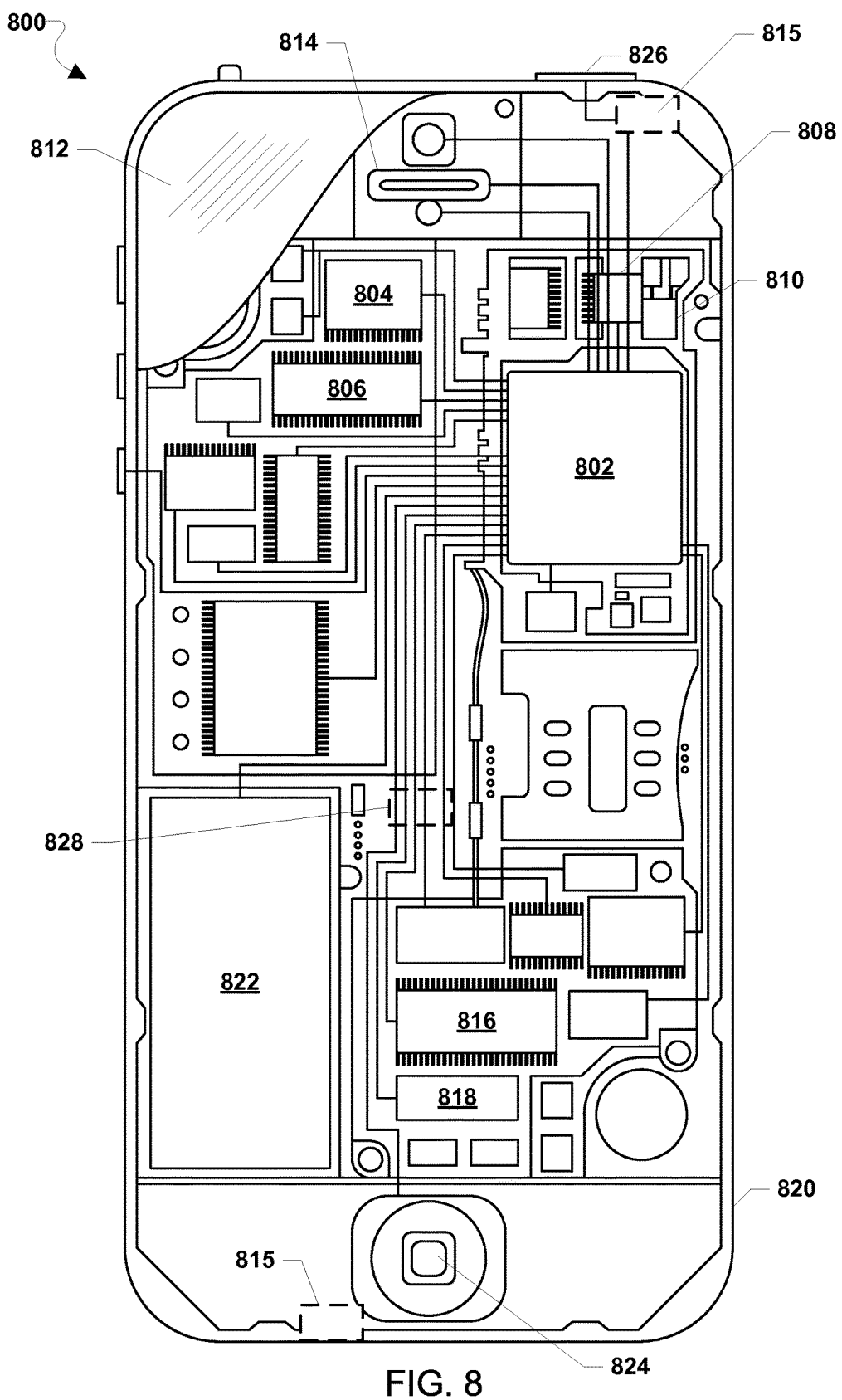
FIG. 8 is a component diagram of a mobile computing device suitable for use with various embodiments.

The various aspects, such as communication with the UAV 100 through a Docking App, may be implemented in any of a variety of mobile computing devices (e.g., smartphones, tablets, smartwatches, etc.) an example of which is illustrated in FIG. 8. The mobile computing device 800 may include a processor 802 coupled with the various systems of the mobile computing device 800 for communication with and control thereof. For example, the processor 802 may be coupled to a touch screen controller 804, radio communication elements, speakers and microphones, and an internal memory 806. The processor 802 may be one or more multi-core integrated circuits designated for general or specific processing tasks. The internal memory 806 may be volatile or non-volatile memory, and may also be secure and/or encrypted memory, or unsecure and/or unencrypted memory, or any combination thereof. In another embodiment (not shown), the mobile computing device 800 may also be coupled to an external memory, such as an external hard drive.

The touch screen controller 804 and the processor 802 may also be coupled to a touch screen panel 812, such as a resistive-sensing touch screen, capacitive-sensing touch screen, infrared sensing touch screen, etc. Additionally, the display of the mobile computing device 800 need not have touch screen capability. The mobile computing device 800 may have one or more radio signal transceivers 808 (e.g., Peanut, Bluetooth, Bluetooth LE, ZigBee, Wi-Fi®, radio frequency (RF) radio, etc.) and antennae, the mobile computing device antenna 810, for sending and receiving communications, coupled to each other and/or to the processor 802. The radio signal transceivers 808 and the mobile computing device antenna 810 may be used with the above-mentioned circuitry to implement the various wireless transmission protocol stacks and interfaces. The mobile computing device 800 may include a cellular network wireless modem chip 816 coupled to the processor that enables communication via a cellular network.

The mobile computing device 800 may include a peripheral device connection interface 818 coupled to the processor 802. The peripheral device connection interface 818 may be singularly configured to accept one type of connection, or may be configured to accept various types of physical and communication connections, common or proprietary, such as USB, FireWire, Thunderbolt, or PCIe. The peripheral device connection interface 818 may also be coupled to a similarly configured peripheral device connection port (not shown).

In various embodiments, the mobile computing device 800 may include microphones 815. For example, the mobile computing device may have a conventional microphone 815 for receiving voice or other audio frequency energy from a user during a call.

The mobile computing device 800 may also include speakers 814 for providing audio outputs. The mobile computing device 800 may also include a housing 820, constructed of a plastic, metal, or a combination of materials, for containing all or some of the components discussed herein. The mobile computing device 800 may include a power source 822 coupled to the processor 802, such as a disposable or rechargeable battery. The rechargeable battery may also be coupled to the peripheral device connection port to receive a charging current from a source external to the mobile computing device 800. The mobile computing device 800 may also include a physical button 824 for receiving user inputs. The mobile computing device 800 may also include a power button 826 for turning the mobile computing device 800 on and off.

In various embodiments, the mobile computing device 800 may further include an accelerometer 828, which senses movement, vibration, and other aspects of the device through the ability to detect multi-directional values of and changes in acceleration. In the various embodiments, the accelerometer 828 may be used to determine the x, y, and z positions of the mobile computing device 800. Using the information from the accelerometer, a pointing direction of the mobile computing device 800 may be detected.

Figure 9:
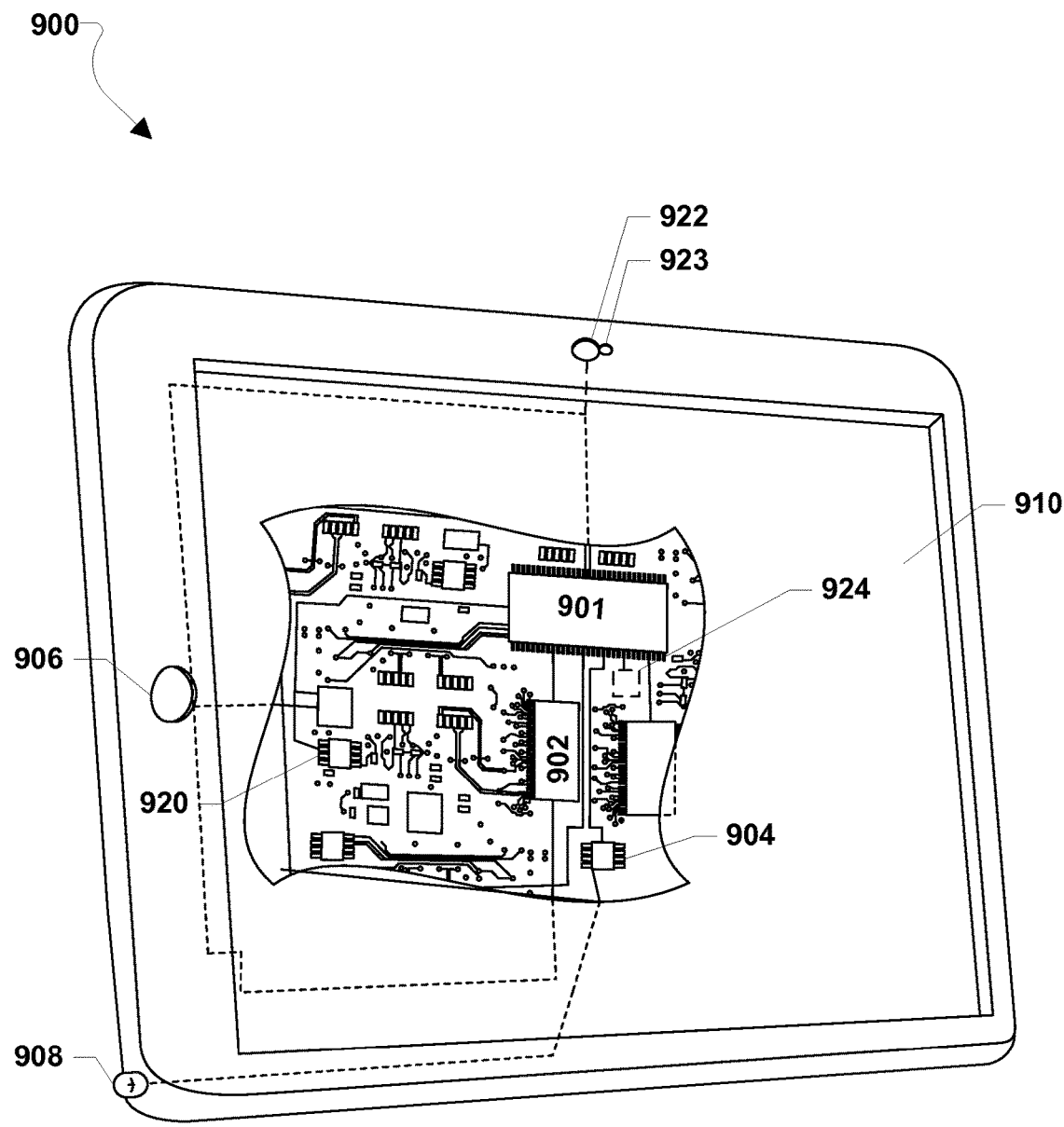
FIG. 9 is a component diagram of an example mobile computing device suitable for use with various embodiments.
Figure 10:
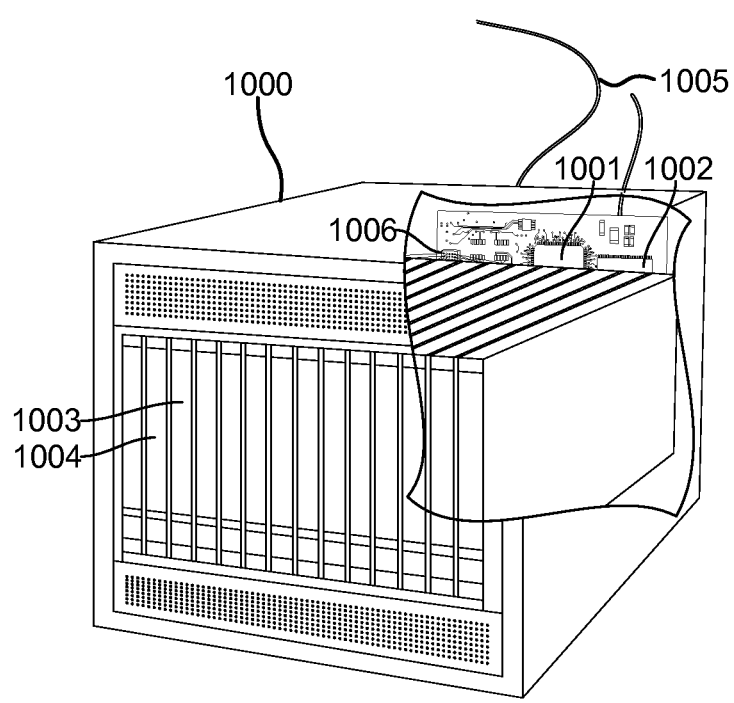
FIG. 10 is a component diagram of server suitable for use with various embodiments.

The various embodiments may be implemented in any of a variety of tablet computing devices, an example of which is illustrated in FIG. 9. For example, a tablet computing device 900, which is a form of computing device, may include a processor 901 coupled to internal memory 902. The internal memory 902 may be volatile or non-volatile memory, and may also be secure and/or encrypted memory, or unsecure and/or unencrypted memory, or any combination thereof. The processor 901 may also be coupled to a touch screen display 910, such as a resistive-sensing touch screen, capacitive-sensing touch screen infrared sensing touch screen, etc. The tablet computing device 900 may have one or more radio signal transceivers 904 (e.g., Peanut, Bluetooth, ZigBee, Wi-Fi®, RF radio) and antennas 908 for sending and receiving wireless signals as described herein. The radio signal transceivers 904 and antennas 908 may be used with the above-mentioned circuitry to implement the various wireless transmission protocol stacks and interfaces. The tablet computing device 900 may include a cellular network wireless modem chip 920 that enables communication via a cellular network. The tablet computing device 900 may also include a physical button 906 for receiving user inputs. The tablet computing device 900 may also include various sensors coupled to the processor 901, such as a camera 922, a microphone 923, and an accelerometer 924.

Also in some embodiments, the tablet computing device 900 may further include the accelerometer 924 that senses movement, vibration, and other aspects of the tablet computing device 900 through the ability to detect multi-directional values of and changes in acceleration. In the various embodiments, the accelerometer 924 may be used to determine the x, y, and z positions of the tablet computing device 900. Using the information from the accelerometer 924, a pointing direction of the tablet computing device 900 may be detected.

Various forms of computing devices may be used to communicate with a processor of a UAV, including personal computers, mobile computing devices (e.g., smartphones, etc.), servers, laptop computers, etc., to implement the various embodiments including the embodiments described with reference to FIGS. 1-10. Such computing devices may typically include, at least, the components illustrated in FIG. 10, which illustrates an example server computing device. With reference to FIGS. 1A-10, the server 1000 may typically include a processor 1001 coupled to volatile memory 1002 and large capacity nonvolatile memory 1003, 1004, such as a disk drive. The server 1000 may also include a floppy disc drive, compact disc (CD) or digital versatile disc (DVD) disc drive coupled to the processor 1001. The server 1000 may also include network access ports 1005 (or interfaces) coupled to the processor 1001 for establishing data connections with a network, such as the Internet and/or a local area network coupled to other system computers and servers. Similarly, the server 1000 may include additional access ports 1006, such as USB, Firewire, Thunderbolt, and the like for coupling to peripherals, external memory, or other devices.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of operating an unmanned aerial vehicle (UAV), comprising:
   determining, by a processor of the UAV, whether to dock on a vehicle to reach a UAV destination;
   identifying, by the processor, one or more candidate vehicles for docking in response to determining to dock on the vehicle;
   determining, by the processor, travel profile characteristics of the one or more candidate vehicles, wherein the travel profile characteristics of each of the one or more candidate vehicles identify at least a vehicle destination of a respective candidate vehicle or a vehicle route to the vehicle destination;
   selecting, from among the one or more candidate vehicles, a first vehicle having the vehicle destination or the vehicle route that is compatible with the UAV destination or a UAV route to the UAV destination, respectively; and
   docking the UAV with the first vehicle.

2. The method of claim 1, wherein determining whether to dock on the vehicle comprises:
   determining, by the processor, whether a charge level of an onboard battery of the UAV is sufficient to meet a mission power requirement for reaching the UAV destination; and
   determining to dock on the vehicle is in response to determining that the charge level of the onboard battery of the UAV is insufficient to meet the mission power requirement.

3. The method of claim 1, wherein determining whether to dock on the vehicle comprises:
   determining, by the processor, a first cost associated with reaching the UAV destination without docking on the vehicle and a second cost associated with reaching the UAV destination by docking on the vehicle; and
   determining, by the processor, whether the first cost is less than the second cost.

4. The method of claim 1, wherein determining, by the processor, the travel profile characteristics of the one or more candidate vehicles comprises:
   receiving from each of the one or more candidate vehicles one or more of the travel profile characteristics via an established communication link.

5. The method of claim 1, wherein determining, by the processor, travel profile characteristics of the one or more candidate vehicles comprises:
   receiving from a server computing device one or more of the travel profile characteristics.

6. The method of claim 1, wherein identifying the one or more candidate vehicles for docking comprises:

receiving an approval to dock from each of the one or more candidate vehicles.

7. The method of claim 1, wherein identifying the one or more candidate vehicles for docking comprises:
receiving an approval to dock from a vehicle that does not include a docking mechanism specifically for receiving the UAV.

8. The method of claim 1, wherein one or more of the travel profile characteristics include information selected from a group consisting of a current speed of the one or more candidate vehicles, a type of docking station with which the one or more candidate vehicles is equipped, whether the one or more candidate vehicles is willing to take small deviations from a course or route to allow the UAV to dock, whether the one or more candidate vehicles is willing to slow down to allow the UAV to dock, a maximum UAV weight the candidate vehicle may accept, a maximum UAV size the candidate vehicle can accept, traffic conditions, a location of the one or more candidate vehicles, a designated destination of the one or more candidate vehicles, a designated route of the one or more candidate vehicles, and contextual information from which a determined destination or route may be obtained by the processor.

9. The method of claim 1, wherein selecting the first vehicle from the one or more candidate vehicles is based on one or more of:
a first proximity of the first vehicle to the UAV;
a second proximity of a designated destination of the first vehicle to the UAV destination; and
an average speed of the first vehicle toward the designated destination of the first vehicle.

10. The method of claim 1, wherein selecting, from among the one or more candidate vehicles, the first vehicle having the vehicle destination or the vehicle route that is compatible with the UAV destination or the UAV route to the UAV destination comprises:
estimating a docking duration that the UAV will be able to remain docked with each of the one or more candidate vehicles based on the vehicle destination of each of the candidate vehicles; and
selecting the first vehicle based at least in part on whether the estimated docking duration enables the UAV to recharge an onboard battery to a level meeting mission power requirements that will assist the UAV in reaching the UAV destination.

11. The method of claim 1, wherein selecting, from among the one or more candidate vehicles, the first vehicle having one or more travel profile characteristics that will assist the UAV in reaching the UAV destination comprises:
estimating a quantity of energy that may be harvested once docked with the first vehicle; and
selecting the first vehicle based at least in part on whether the estimated quantity of energy enables the UAV to recharge an onboard battery to a level meeting mission power parameters that will assist the UAV in reaching the UAV destination.

12. The method of claim 1, wherein selecting, from among the one or more candidate vehicles the first vehicle having one or more travel profile characteristics that will assist the UAV in reaching the UAV destination comprises:
determining a net recharge quantity of an onboard battery is estimated to be recharged once docked with the first vehicle, wherein the net recharge quantity takes into account an energy expenditure associated with the UAV completing a course deviation to reach the first vehicle; and selecting the first vehicle based at least in part on whether the net recharge quantity enables the UAV to recharge the onboard battery to a level meeting mission power parameters that will assist the UAV in reaching the UAV destination.

13. The method of claim 1, wherein selecting, from among the one or more candidate vehicles, the first vehicle having one or more travel profile characteristics that will assist the UAV in reaching the UAV destination comprises:
determining a ranking associated with each of the one or more candidate vehicles; and
selecting the first vehicle based at least in part on the determined ranking.

14. The method of claim 1, wherein docking the UAV to the first vehicle comprises:
flying the UAV to within a predetermined proximity of a docking mechanism of the first vehicle; and
engaging a latching mechanism on the docking mechanism with a structure of the UAV.

15. The method of claim 14, further comprising charging an onboard battery of the UAV via a power connection or wireless charging mechanism on the docking mechanism while the UAV is docked to the first vehicle.

16. The method of claim 1, further comprising charging an onboard battery of the UAV by using rotors to harvest energy from wind caused by vehicle movement while docked with the first vehicle.

17. The method of claim 1, further comprising:
monitoring, by the processor, progress toward the UAV destination while docked to the first vehicle;
determining, by the processor, whether to undock from the first vehicle based on progress toward the UAV destination; and
undocking the UAV from the first vehicle in response to determining to undock from the first vehicle.

18. The method of claim 17, wherein determining whether to undock from the first vehicle is based on an identification of a more suitable vehicle with new travel profile characteristics that will assist the UAV in reaching the UAV destination.

19. The method of claim 1, further comprising:
monitoring, by the processor, a level that an onboard battery has been recharged while docked to the first vehicle;
and
undocking the UAV from the first vehicle in response to the level that the onboard battery has been recharged meets a mission power parameter.

20. An unmanned aerial vehicle (UAV), comprising:
a memory; and
a processor coupled to the memory and configured with processor-executable instructions to:
determine whether to dock on a vehicle to reach a UAV destination;
identify one or more candidate vehicles for docking in response to determining that the UAV should dock on the vehicle;
determine travel profile characteristics of the one or more candidate vehicles, wherein the travel profile characteristics of each of the one or more candidate vehicles identify at least a vehicle destination of a respective candidate vehicle or a vehicle route to the vehicle destination;
select from among the one or more candidate vehicles a first vehicle having the vehicle destination or the vehicle route that is compatible with the UAV destination or a UAV route to the UAV destination, respectively; and dock the UAV with the first vehicle.

21. The UAV of claim 20, wherein the processor is further configured with the processor-executable instructions to determine whether to dock on the vehicle by:

determining whether a charge level of an onboard battery of the UAV is sufficient to meet a mission power requirement for reaching the UAV destination; and determining to dock on the vehicle is in response to determining that the charge level of the onboard battery of the UAV is insufficient to meet the mission power requirement.

22. The UAV of claim 20, wherein the processor is further configured with the processor-executable instructions to identifying the one or more candidate vehicles for docking by:

receiving an approval to dock from a vehicle that does not include a docking mechanism specifically for receiving the UAV.

23. The UAV of claim 20, wherein the processor is further configured with the processor-executable instructions to determine the first vehicle from the one or more candidate vehicles by:

receiving an approval to dock from a vehicle that does not include a docking mechanism specifically for receiving the UAV.

24. The UAV of claim 20, further comprising:

an onboard battery coupled to the processor, wherein the processor is further configured with the processor-executable instructions to determine the first vehicle from the one or more candidate vehicles by:

estimating a docking duration the UAV will be able to remain docked with the first vehicle based on a designated destination of the first vehicle; and selecting the first vehicle based at least in part on whether the estimated docking duration enables the UAV to recharge the onboard battery to a level meeting mission power parameters that will assist the UAV in reaching the UAV destination.

25. The UAV of claim 20, further comprising:

an onboard battery coupled to the processor; and rotors coupled to the onboard battery, wherein the processor is further configured with the processor-executable instructions to harvest energy from wind caused by vehicle movement by configuring the rotors to charge the onboard battery while docked with the first vehicle.

26. The UAV of claim 20, wherein the processor is further configured with the processor-executable instructions to:

monitor progress toward the UAV destination while docked to the first vehicle;

determine whether to undock from the first vehicle based on progress toward the UAV destination; and undock the UAV from the first vehicle in response to determining to undock from the first vehicle.

27. The UAV of claim 20, wherein the processor is further configured with the processor-executable instructions to:

monitor charging of an onboard battery while docked to the first vehicle;

determine whether to undock from the first vehicle based on whether the UAV has recharged the onboard battery to a predetermined level; and undock the UAV from the first vehicle in response to determining to undock from the first vehicle.

28. An unmanned autonomous vehicle (UAV), comprising:

means for determining whether to dock on a vehicle to reach a UAV destination;

means for identifying one or more candidate vehicles for docking in response to determining to dock on the vehicle;

means for determining, by the processor, travel profile characteristics of the one or more candidate vehicles, wherein the travel profile characteristics of each of the one or more candidate vehicles identify at least a vehicle destination of a respective candidate vehicle or a vehicle route to the vehicle destination;

means for selecting from among the one or more candidate vehicles a first vehicle having the vehicle destination or the vehicle route that is compatible with the UAV destination or a UAV route to the UAV destination, respectively; and means for docking the UAV with the first vehicle.

29. A non-transitory processor-readable storage medium having stored thereon processor-executable instructions configured to cause a processor of an unmanned autonomous vehicle (UAV) to perform operations comprising:

determining whether to dock on a vehicle to reach a UAV destination;

identifying one or more candidate vehicles for docking in response to determining to dock on the vehicle;

determining travel profile characteristics of the one or more candidate vehicles, wherein the travel profile characteristics of each of the one or more candidate vehicles identify at least a vehicle destination of a respective candidate vehicle or a vehicle route to the vehicle destination;

selecting from among the one or more candidate vehicles a first vehicle having the vehicle destination or the vehicle route that is compatible with the UAV destination or a UAV route to the UAV destination, respectively; and docking the UAV with the first vehicle.

* * * * *